United States Patent
Ito et al.

(10) Patent No.: US 11,750,491 B2
(45) Date of Patent: Sep. 5, 2023

(54) INFORMATION PROCESSING DEVICE AND INFORMATION PROCESSING METHOD

(71) Applicant: Panasonic Intellectual Property Management Co., Ltd., Osaka (JP)

(72) Inventors: Takayoshi Ito, Osaka (JP); Yuishi Torisaki, Osaka (JP); Takamitsu Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 80 days.

(21) Appl. No.: 17/318,415

(22) Filed: May 12, 2021

(65) Prior Publication Data
US 2021/0359927 A1 Nov. 18, 2021

(30) Foreign Application Priority Data
May 14, 2020 (JP) ................. 2020-085460

(51) Int. Cl.
| | |
|---|---|
| H04W 4/46 | (2018.01) |
| H04W 68/04 | (2009.01) |
| H04W 84/12 | (2009.01) |
| H04B 1/38 | (2015.01) |
| H04B 17/318 | (2015.01) |
| H04L 43/10 | (2022.01) |
| H04W 8/22 | (2009.01) |
| H04W 4/40 | (2018.01) |
| H04L 9/40 | (2022.01) |

(52) U.S. Cl.
CPC ............ H04L 43/10 (2013.01); H04W 8/22 (2013.01); *H04L 63/107* (2013.01); *H04W 4/40* (2018.02); *H04W 4/46* (2018.02)

(58) Field of Classification Search
CPC . H04L 43/10; H04L 2012/2841; H04L 67/52; B60R 25/33; B60W 2556/60; G05D 1/0278; H04W 4/029; G01S 13/42; G01S 13/931
USPC .................... 348/11.99; 455/435.1
See application file for complete search history.

(56) References Cited

U.S. PATENT DOCUMENTS

| | | | |
|---|---|---|---|
| 2008/0310347 A1 | 12/2008 | Morishige et al. | |
| 2015/0249925 A1* | 9/2015 | Haro .................. | H04W 12/126 455/410 |
| 2018/0049129 A1* | 2/2018 | Li ..................... | H04W 52/0235 |
| 2018/0215393 A1* | 8/2018 | Miyakubo ............ | B60W 50/14 |
| 2019/0140754 A1* | 5/2019 | Shimoirisa ............ | H04B 17/23 |
| 2019/0287406 A1* | 9/2019 | Kurehashi ............ | G08G 1/0145 |

FOREIGN PATENT DOCUMENTS

JP    2008-312091    12/2008

* cited by examiner

Primary Examiner — Wutchung Chu
Assistant Examiner — Jason A Harley
(74) Attorney, Agent, or Firm — GREENBLUM & BERNSTEIN, P.L.C.

(57) ABSTRACT

A server as an information processing device includes: a communicator that communicates with mobile a body; a monitoring data storage that stores past monitoring data of the mobile body received by the communicator; and an alive monitor that determines whether a current state of the mobile body is anomalous, based on the past monitoring data stored in the monitoring data storage.

10 Claims, 13 Drawing Sheets

INFORMATION PROCESSING DEVICE AND INFORMATION PROCESSING METHOD

CROSS REFERENCE TO RELATED APPLICATION

The present application is based on and claims priority of Japanese Patent Application No. 2020-085460 filed on May 14, 2020.

FIELD

The present disclosure relates to an information processing device, etc. for monitoring a mobile body.

BACKGROUND

Conventionally, a mobile body communication system and an alive monitoring method for performing alive monitoring on a mobile terminal which is a mobile body are proposed (for example, see Patent Literature (PTL) 1).

In the mobile body communication system in PTL 1, an access gateway device transmits an alive monitoring packet to a mobile terminal, and performs alive monitoring on the mobile terminal depending on whether the mobile body responds to the alive monitoring packet. The mobile body communication system selects an alive monitoring method optimal for the connection state of the mobile terminal.

CITATION LIST

Patent Literature

PTL 1: Japanese Unexamined Patent Application Publication No. 2008-312091

SUMMARY

However, the information processing device such as the access gateway device included in the mobile body communication system in PTL 1 can be improved upon.

In view of this, the present disclosure provides an information processing device capable of improving upon the above related art.

An information processing device according to an aspect of the present disclosure includes: a communicator that communicates with a first mobile body; a monitoring data storage that stores past monitoring data of the first mobile body received by the communicator; and an alive monitor that determines whether a current state of the first mobile body is anomalous, based on the past monitoring data stored in the monitoring data storage.

These general and specific aspects may be implemented using a system, a method, an integrated circuit, a computer program, or a computer-readable recording medium such as CD-ROM, or any combination of systems, methods, integrated circuits, computer programs, and recording media.

An information processing device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
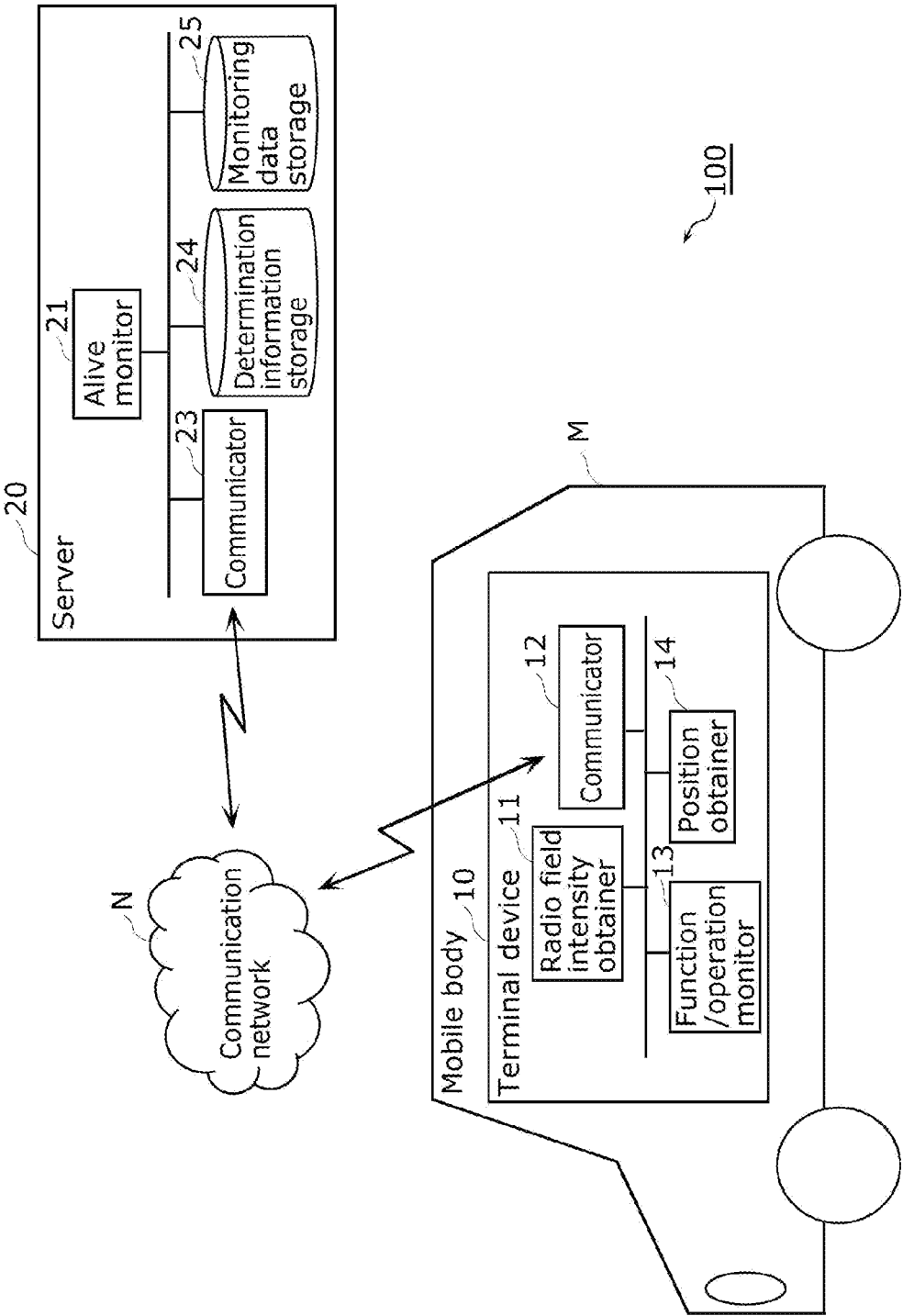
FIG. 1 is a diagram illustrating an example of the structure of a communication system in an embodiment.

The inventor of the present application found that the mobile body communication system in PTL 1 described in the "Background" section has the following problem.

The information processing device such as the access gateway device included in the mobile body communication system in PTL 1 has a problem that a state of the mobile body cannot be determined more appropriately.

In view of this, the present disclosure provides an information processing device, etc. capable of determining the state of a mobile body more appropriately.

To solve the problem stated above, an information processing device according to an aspect of the present disclosure includes: a communicator that communicates with a first mobile body; a monitoring data storage that stores past monitoring data of the first mobile body received by the communicator; and an alive monitor that determines whether a current state of the first mobile body is anomalous, based on the past monitoring data stored in the monitoring data storage. The information processing device is implemented, for example, as a server.

In this way, even when the latest monitoring data cannot be received from the first mobile body to be monitored (i.e. monitoring target), the current state of the first mobile body is determined from the past monitoring data. Therefore, for example, even when the communication with the first mobile body is unstable and is currently not possible, whether the first mobile body is currently out of range of communication or anomalous can be determined appropriately. In the case where the first mobile body is determined to be anomalous, the anomaly can be notified.

Monitoring data of the first mobile body may include at least one of (a) first position information indicating a position of the first mobile body at a time of generation of the monitoring data, (b) radio field intensity information indicating a radio field intensity of radio used for the communication between the first mobile body and the communicator at the time of generation of the monitoring data, or (c) operation information indicating whether an operation or function of the first mobile body is anomalous or normal at the time of generation of the monitoring data.

In this way, whether the current state of the first mobile body is anomalous can be determined more appropriately.

The alive monitor may determine whether the current state of the first mobile body is anomalous using the past monitoring data stored in the monitoring data storage, when the communicator does not receive, from the first mobile body, at least one of latest monitoring data or a heartbeat signal.

In this way, when the latest monitoring data is received, the current state of the first mobile body is determined using the latest monitoring data. When the latest monitoring data and/or the heartbeat signal is not received, the current state of the first mobile body is determined using the past monitoring data. Hence, the current state of the first mobile body can be determined appropriately regardless of whether the latest monitoring data is received.

The information processing device may further include: a determination information storage that stores a threshold for a total number of mobile bodies to determine whether the first mobile body is anomalous, the monitoring data storage may store the past monitoring data of the first mobile body, and past monitoring data of each of a plurality of second mobile bodies received by the communicator, the past monitoring data of the first mobile body may be first position information indicating a past position of the first mobile body, and the past monitoring data of each of the plurality of second mobile bodies may be second position information indicating a past position of the second mobile body, and the alive monitor may determine whether the current state of the first mobile body is anomalous, depending on whether the communicator receives the second position information from each of second mobile bodies not less in number than the threshold from among one or more second mobile bodies which locate a predetermined distance from the past position indicated by the first position information.

In this way, for example, in the case where the latest first position information is not received from the monitoring target first mobile body despite the second position information being received from each of the second mobile bodies not less in number than the threshold present around the first mobile body, it is determined that the current state of the first mobile body is anomalous. In the case where the second position information is not received from each of the second mobile bodies not less in number than the threshold, it is determined that the current state of the first mobile body is normal and the first mobile body is out of range of communication. Hence, even when the communication with the first mobile body is currently not possible, whether the first mobile body is currently out of range of communication or anomalous can be determined appropriately.

The past monitoring data of the first mobile body may be first position information indicating a past position of the first mobile body, and the alive monitor may determine whether the current state of the first mobile body is anomalous, depending on whether the communicator receives the third position information from the first mobile body before receiving the first position information, the third position information indicating a position within a predetermined distance from the past position indicated by the first position information.

In this way, for example, in the case where, before the first position information, the third position information indicating the vicinity of the position indicated by the first position information is received, it is determined that the current state of the first mobile body is anomalous. In the case where the third position information is not received, it is determined that the current state of the first mobile body is normal and the first mobile body is out of range of communication. Hence, even when the communication with the first mobile body is currently not possible, whether the first mobile body is currently out of range of communication or anomalous can be determined appropriately.

The information processing device may further include: a determination information storage that stores a threshold for a radio field intensity to determine whether the first mobile body is anomalous, the past monitoring data of the first mobile body may indicate a past radio field intensity of radio used for the communication between the first mobile body and the communicator, and the alive monitor may determine whether the current state of the first mobile body is anomalous, depending on whether the past radio field intensity is greater than or equal to the threshold.

In this way, for example, in the case where the radio field intensity indicated by the past monitoring data stored most recently in the monitoring data storage is greater than or equal to the threshold, it is determined that the current state of the first mobile body is anomalous. In the case where the radio field intensity is less than the threshold, it is determined that the current state of the first mobile body is normal and the first mobile body is out of range of communication. Hence, even when the communication with the first mobile body is currently not possible, whether the first mobile body is currently out of range of communication or anomalous can be determined appropriately.

The information processing device may further include: a determination information storage that stores determination information for determining a state of the first mobile body, the past monitoring data of the first mobile body may indicate a past position of the first mobile body or a past radio field intensity of radio used for the communication between the first mobile body and the communicator, and the alive monitor may: calculate a communication standby time based on the past position or the past radio field intensity indicated by the past monitoring data and the determination information; and determine whether the current state of the first mobile body is anomalous, depending on whether the communicator receives the latest monitoring data before the communication standby time elapses from a timing at which the communicator is scheduled to receive the latest monitoring data.

For example, the communication success rate between the first mobile body and the communicator is derived from the past position or the past radio field intensity, the number of consecutive communication trials considered to be sufficient for communication to be successful is derived from the communication success rate, and the communication standby time which is the time during which communication is tried the number of consecutive communication trials is calculated. In the case where the latest monitoring data is not received from the first mobile body even after at least the communication standby time elapses, it is determined that the current state of the first mobile body is anomalous. In the case where the latest monitoring data is received from the first mobile body before the communication standby time elapses, it is determined that the current state of the first mobile body is normal and the first mobile body is nearly out of range of communication. Hence, even when the communication with the first mobile body is currently not possible, whether the first mobile body is nearly out of range of communication or anomalous can be determined appropriately.

The past monitoring data of the first mobile body may be operation information indicating whether a past operation or function of the first mobile body is anomalous or normal, and the alive monitor may determine whether the current state of the first mobile body is anomalous, depending on the operation information.

In this way, for example, in the case where the past operation information stored most recently in the monitoring data storage indicates the past operation or function of the first mobile body to be anomalous, it is determined that the current state of the first mobile body is anomalous. In the case where the past operation information indicates the past operation or function of the first mobile body to be normal, it is determined that the current state of the first mobile body is normal and the first mobile body is out of range of communication. Hence, even when the communication with the first mobile body is currently not possible, whether the first mobile body is currently out of range of communication or anomalous can be determined appropriately.

The past monitoring data of the first mobile body may indicate a past position of the first mobile body and a past radio field intensity of radio used for the communication between the first mobile body and the communicator, and the alive monitor may determine whether the current state of the first mobile body is anomalous, depending on whether a difference between the past radio field intensity indicated by the past monitoring data and a reference value of a radio field intensity at the past position is greater than or equal to the threshold.

In this way, for example, in the case where the difference between the radio field intensity indicated by the past monitoring data stored most recently in the monitoring data storage and the reference value of the radio field intensity at the position indicated by the monitoring data is large, it is determined that the current state of the first mobile body is anomalous. In the case where the difference between the radio field intensity and the reference value is small, it is determined that the current state of the first mobile body is normal and the first mobile body is out of range of communication. Hence, even when the communication with the first mobile body is currently not possible, whether the first mobile body is currently out of range of communication or anomalous can be determined appropriately.

Monitoring data of the first mobile body may indicate a position of the first mobile body and a radio field intensity of radio used for the communication between the first mobile body and the communicator at a time of generation of the monitoring data, and the alive monitor may determine whether the current state of the first mobile body is anomalous, depending on whether a difference between a past radio field intensity indicated by past monitoring data including the third position information or a reference value of a radio field intensity at a past position indicated by the past monitoring data and a radio field intensity of radio communication indicated by latest monitoring data received by the communicator from the first mobile body is greater than or equal to the threshold, the third position information indicating a position within a predetermined distance from a position of the first mobile body indicated by the latest monitoring data.

In this way, for example, in the case where the difference between the radio field intensity indicated by the latest monitoring data and the past radio field intensity at the position indicated by the monitoring data or the reference value of the radio field intensity at the position is large, it is determined that the current state of the first mobile body is anomalous. In the case where the difference between the radio field intensity and the reference value is small, it is determined that the current state of the first mobile body is normal. Hence, even when the communication with the first mobile body is currently possible and the monitoring data does not directly indicate anomaly, whether the first mobile body is anomalous can be determined appropriately.

An information processing device according to an aspect of the present disclosure is an information processing device mountable in a mobile body, the information processing device including: an obtainer that periodically obtains monitoring data indicating a state of the mobile body; and a communicator that, each time the obtainer obtains the monitoring data, transmits the monitoring data obtained, to an external device located outside the mobile body, wherein the monitoring data includes at least one of position information indicating a position of the mobile body, radio field intensity information indicating a radio field intensity of radio used for the communication between the communicator and the external device, or operation information indicating whether an operation or function of the mobile body is normal or anomalous. The information processing device is implemented, for example, as a terminal device mounted in a mobile body such as a vehicle.

In this way, even when the external device cannot receive the latest monitoring data transmitted from the information processing device, the external device can appropriately determine whether the current state of the mobile body is anomalous using the past monitoring data.

These general and specific aspects may be implemented using a system, a method, an integrated circuit, a computer program, or a computer-readable recording medium such as CD-ROM, or any combination of systems, methods, integrated circuits, computer programs, and recording media.

An embodiment will be described in detail below, with reference to the drawings.

The embodiment described below shows a general and specific example. The numerical values, shapes, materials, structural elements, the arrangement and connection of the structural elements, steps, the order of steps, etc. shown in the following embodiment are mere examples, and do not limit the scope of the present disclosure. Of the structural elements in the embodiment described below, the structural elements not recited in any one of the independent claims representing the broadest concepts are described as optional structural elements. Each drawing is a schematic, and does not necessarily provide precise depiction. The same structural elements are given the same reference marks throughout the drawings.

Embodiment

FIG. 1 is a diagram illustrating an example of the structure of a communication system in this embodiment.

Communication system 100 in this embodiment includes terminal device 10, communication network N, and server 20.

Terminal device 10 is an information processing device mounted in mobile body M such as a vehicle. Terminal device 10 in this embodiment includes radio field intensity obtainer 11, communicator 12, function/operation monitor 13, and position obtainer 14. Although terminal device 10 includes radio field intensity obtainer 11, function/operation monitor 13, and position obtainer 14 in this embodiment, terminal device 10 does not need to include all of these structural elements, and may include at least one of these structural elements. Mobile body M is not limited to a vehicle, and may be a ship, aircraft, a wearable device, a portable device, etc. Mobile body M in this embodiment is a monitoring target mobile body monitored by server 20, and is also referred to as "first mobile body".

Radio field intensity obtainer 11 obtains the radio field intensity of radio communication performed by communicator 12, and outputs radio field intensity information indicating the radio field intensity to communicator 12. The obtainment of the radio field intensity and the output of the radio field intensity information indicating the radio field intensity are performed periodically. The radio field intensity information indicates a larger value when the intensity of radio waves is higher.

Function/operation monitor 13 monitors the operation or function of mobile body M, and outputs information indicating the monitoring result to communicator 12 as operation information. The monitoring and the output of the operation information indicating the monitoring result are performed periodically.

Position obtainer 14 performs positioning of mobile body M, and outputs information obtained as a result of the positioning, i.e. information indicating the position of mobile body M, to communicator 12 as position information. The positioning and the output of the position information indicating the measured position are performed periodically. For example, position obtainer 14 performs positioning using a global navigation satellite system (GNSS). The position information indicating the position of monitoring target mobile body M is hereafter also referred to as "first position information".

Communicator 12 communicates with server 20 via communication network N. The communication by communicator 12 is radio communication mentioned above. For example, radio communication is performed between communicator 12 and a base station included in communication network N and present around mobile body M. Communicator 12 transmits at least one of the foregoing radio field intensity information, operation information, and position information to server 20 via communication network N and radio communication.

Each of the radio field intensity information, the operation information, and the position information is information or data indicating a monitoring result of mobile body M, and is hereafter also referred to as "monitoring data". That is, each time monitoring data is output to communicator 12, communicator 12 transmits the monitoring data to server 20. Alternatively, communicator 12 temporarily stores the monitoring data, and transmits the monitoring data to server 20 according to a set cycle (period).

Communicator 12 may repeatedly transmit a heartbeat (heartbeat signal) to server 20 periodically. The heartbeat is, for example, data including identification information of mobile body M or terminal device 10. In this case, communicator 12 may add monitoring data to the heartbeat, and transmit, to server 20, the heartbeat to which the monitoring data has been added. The heartbeat transmission cycle is, for example, 10 seconds to 30 seconds. Communicator 12 may repeatedly transmit monitoring data periodically, without adding it to the heartbeat. In this case, too, the monitoring data transmission cycle may be 10 seconds to 30 seconds.

For example, each of the structural elements such as position obtainer 14 included in terminal device 10 may be an electronic control unit (ECU), and may be included in an in-vehicle network. The in-vehicle network is a network system including a plurality of ECUs connected to each other via a bus (i.e. network bus). The plurality of ECUs may communicate with each other according to a Controller Area Network (CAN) protocol defined in ISO 11898. In this case, each of the plurality of ECUs transmits and receives CAN frames. Examples of frame types include data frame, remote frame, overload frame, and error frame. The plurality of ECUs may be connected by Ethernet.

Thus, terminal device 10 in this embodiment is an information processing device mounted in mobile body M, and includes: an obtainer that periodically obtains monitoring data indicating the state of mobile body M; and communicator 12 that periodically transmits the monitoring data obtained by the obtainer to an external device outside mobile body M. The obtainer includes at least one structural element selected from radio field intensity obtainer 11, function/operation monitor 13, and position obtainer 14. The external device is, for example, server 20. The monitoring data includes at least one of position information indicating the position of mobile body M, radio field intensity information indicating the radio field intensity of radio used for the communication between communicator 12 and the external device, or operation information indicating whether the operation or function of mobile body M is normal or anomalous.

In this way, even when the external device such as server 20 cannot receive the latest monitoring data transmitted from terminal device 10, the external device can appropriately determine whether the current state of mobile body M is anomalous using past monitoring data.

Server 20 is an information processing device that remotely monitors mobile body M, and includes alive monitor 21, communicator 23, determination information storage 24, and monitoring data storage 25. Server 20 is, for example, a server installed in a vehicle monitoring center, a security operation center (SOC), or the like.

Communicator 23 receives monitoring data periodically transmitted from communicator 12 in terminal device 10. That is, communicator 23 periodically receives monitoring data from mobile body M. Each time communicator 23 receives monitoring data, communicator 23 outputs the monitoring data to alive monitor 21.

Monitoring data storage 25 is a recording medium for storing monitoring data. The monitoring data stored in monitoring data storage 25 is past monitoring data.

Determination information storage 24 is a recording medium that stores determination information. The determination information is information used to determine whether mobile body M is anomalous.

Examples of recording media such as monitoring data storage 25 and determination information storage 24 include a hard disk, read only memory (ROM), random access memory (RAM), and semiconductor memory. Such recording media may be volatile or nonvolatile.

Alive monitor 21 performs alive monitoring on mobile body M, based on a result of communication by communicator 23. For example, if communicator 23 receives latest monitoring data, alive monitor 21 determines whether the current state of mobile body M is anomalous, using the latest monitoring data. Alive monitor 21 then stores the latest monitoring data used for the determination, in monitoring data storage 25. If communicator 23 does not receive the latest monitoring data, alive monitor 21 determines whether the current state of mobile body M is anomalous, based on past monitoring data stored in monitoring data storage 25. For example, in the case where a plurality of items of past monitoring data are stored in monitoring data storage 25, alive monitor 21 determines the current state of mobile body M based on past monitoring data most recently stored in monitoring data storage 25.

Thus, server 20 in this embodiment includes: communicator 23 that communicates with mobile body M as the first mobile body; monitoring data storage 25 that stores past monitoring data of mobile body M received by communicator 23; and alive monitor 21 that determines whether the current state of mobile body M is anomalous based on the past monitoring data stored in monitoring data storage 25.

In this way, even when the latest monitoring data cannot be received from monitoring target mobile body M, the current state of mobile body M is determined from the past monitoring data. Therefore, for example, even when the communication with mobile body M is unstable and is currently not possible, whether mobile body M is currently out of range of communication or anomalous can be determined appropriately. In the case where mobile body M is determined to be anomalous, the anomaly can be notified.

Monitoring data of mobile body M includes at least one of (a) first position information indicating the position of mobile body M at the time of generation of the monitoring data, (b) radio field intensity information indicating the radio field intensity of radio used for the communication between mobile body M and communicator 23 at the time of generation of the monitoring data, or (c) operation information indicating whether the operation or function of mobile body M is anomalous or normal at the time of generation of the monitoring data. Thus, whether the current state of mobile body M is anomalous can be determined more appropriately.

Figure 2:
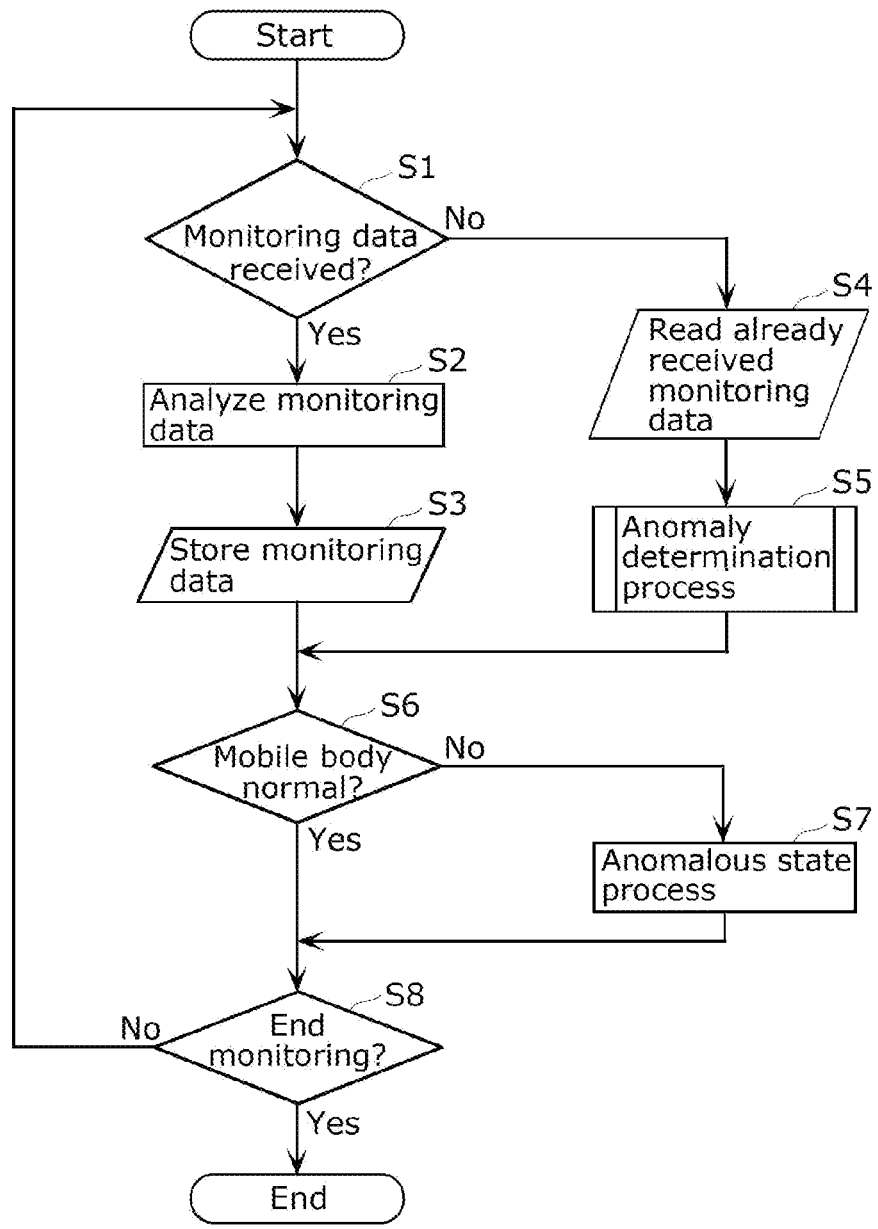
FIG. 2 is a flowchart illustrating an example of the overall process operation of a server in the embodiment.

FIG. 2 is a flowchart illustrating an example of the overall process operation of server 20.

Alive monitor 21 in server 20 determines whether the latest monitoring data is received by communicator 23 (Step S1). For example, alive monitor 21 performs the process in Step S1 when the time of the monitoring data transmission cycle elapses from the timing at which monitoring data was last received. In Step S1, alive monitor 21 may determine whether the latest heartbeat signal is received by communicator 23.

In the case where alive monitor 21 determines that the latest monitoring data is received (Step S1: Yes), alive monitor 21 analyzes the latest monitoring data (Step S2). Alive monitor 21 then stores the analyzed monitoring data in monitoring data storage 25 (Step S3).

After the process in Steps S2 and S3, alive monitor 21 determines whether the current state of mobile body M is normal, based on the analysis result in Step S2 (Step S6). In the case where alive monitor 21 determines that the current state of mobile body M is not normal (Step S6: No), alive monitor 21 performs an anomalous state process (Step S7). For example, alive monitor 21 notifies that mobile body M is anomalous. In the case where alive monitor 21 determines that the current state of mobile body M is normal (Step S6: Yes), alive monitor 21 determines whether to end the alive monitoring for mobile body M (Step S8). In the case where alive monitor 21 determines not to end the alive monitoring (Step S8: No), alive monitor 21 repeats the process from Step S1. In the case where alive monitor 21 determines to end the alive monitoring (Step S8: Yes), alive monitor 21 ends the alive monitoring.

In the case where alive monitor 21 determines that the latest monitoring data (or the latest monitoring data and/or the heartbeat signal) is not received in Step S1 (Step S1: No), alive monitor 21 reads at least one item of monitoring data already received, from monitoring data storage 25 (Step S4). The at least one item of monitoring data includes the foregoing monitoring data stored most recently in monitoring data storage 25. Alive monitor 21 performs the below-described anomaly determination process using the read at least one item of monitoring data (Step S5).

After the process in Steps S4 and S5, alive monitor 21 determines whether the current state of mobile body M is normal, based on the result of the anomaly determination process in Step S5 (Step S6).

Thus, in this embodiment, alive monitor 21 determines whether the current state of mobile body M is anomalous using the past monitoring data stored in monitoring data storage 25, when communicator 23 does not receive the latest monitoring data and/or the heartbeat signal from mobile body M.

In this way, when the latest monitoring data is received, the current state of mobile body M is determined using the latest monitoring data. When the latest monitoring data or the heartbeat signal is not received, the current state of mobile body M is determined using the past monitoring data. Hence, the current state of mobile body M can be determined appropriately regardless of whether the latest monitoring data or the heartbeat signal is received.

Figure 3:
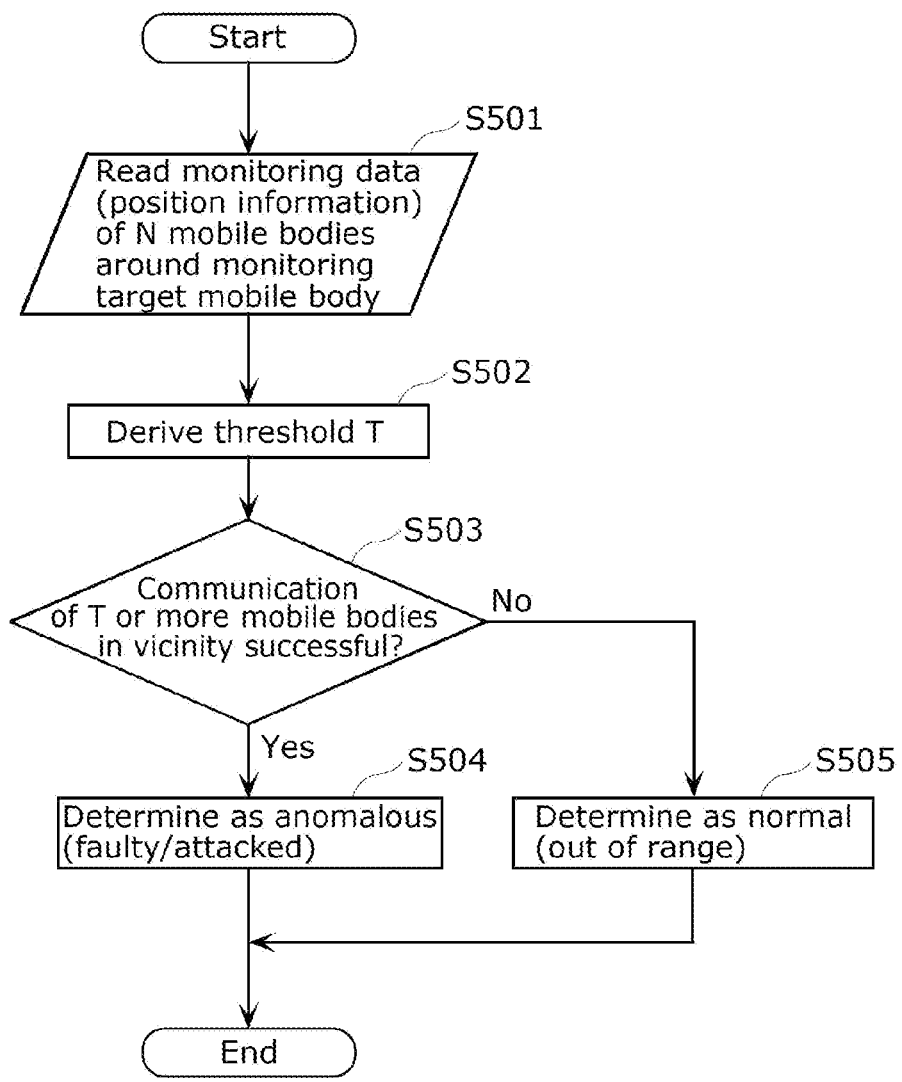
FIG. 3 is a flowchart illustrating an example of an anomaly determination process using position information by the server in the embodiment.

FIG. 3 is a flowchart illustrating an example of an anomaly determination process using position information by server 20. The anomaly determination process is the process in Step S5 in FIG. 2.

In the example illustrated in FIG. 3, communicator 23 in server 20 receives not only monitoring data transmitted from monitoring target mobile body M but also monitoring data transmitted from a plurality of other mobile bodies different from mobile body M. Each of the plurality of other mobile bodies is hereafter also referred to as "other mobile body or "second mobile body". When monitoring data transmitted from the other mobile body is received by communicator 23, alive monitor 21 stores the monitoring data of the other mobile body in monitoring data storage 25 as well as the monitoring data of mobile body M. That is, in the example illustrated in FIG. 3, monitoring data storage 25 stores the past monitoring data of mobile body M and the past monitoring data of each of the plurality of other mobile bodies received by communicator 23. Server 20 may subject the second mobile body to monitoring in addition to mobile body M, and alive monitor 21 may also perform alive monitoring for the monitoring data transmitted from the other mobile body and determine whether the current state of the other mobile body is anomalous.

In the example illustrated in FIG. 3, the past monitoring data of mobile body M is first position information indicating the past position of mobile body M, and the past monitoring data of each of the plurality of other mobile bodies is second position information indicating the past position of the other mobile body. The determination information stored in determination information storage 24 is information relating to threshold T for the number of mobile bodies.

In such a case, alive monitor 21 reads monitoring data of N other mobile bodies (N is an integer greater than or equal to 1) around (i.e. in the vicinity of) monitoring target mobile body M from monitoring data storage 25, as illustrated in FIG. 3 (Step S501). Specifically, alive monitor 21 reads the most recently stored monitoring data from among the plurality of items of past monitoring data of mobile body M stored in monitoring data storage 25. Alive monitor 21 then specifies a predetermined distance from the position indicated by the first position information that is the most recently stored monitoring data. For example, the predetermined range is a range within radius R [m] from the position indicated by the first position information. Following this, alive monitor 21 reads one or more items of second position information each indicating a position within the predetermined range, from monitoring data storage 25. The read one or more items of second position information are the monitoring data of the N other mobile bodies around monitoring target mobile body M.

Alive monitor 21 then derives threshold T (Step S502). For example, alive monitor 21 derives threshold T using the determination information stored in determination information storage 24. The determination information may indicate, for example, a proportion less than or equal to 1. In this case, alive monitor 21 multiplies N by the proportion indicated by the determination information, to derive threshold T. The determination information may indicate a proportion for each region on a map. In this case, alive monitor 21 specifies the proportion for a region including the position indicated by the first position information that is the most recently stored monitoring data, based on the determination information. Alive monitor 21 then multiplies N by the specified proportion, to derive threshold T.

After this, alive monitor 21 determines whether communication is successful in each of other mobile bodies not less in number than threshold T from among the N other mobile bodies around mobile body M (Step S503). That is, alive monitor 21 determines whether second position information transmitted from each of the other mobile bodies not less in number than threshold T is received by communicator 23. In the case where alive monitor 21 determines that the communication is successful, i.e. the second position information is received (Step S503: Yes), alive monitor 21 determines that the current state of mobile body M is anomalous (Step S504). That is, alive monitor 21 determines that mobile body M is currently faulty or cyberattacked. In the case where alive monitor 21 determines that the communication is not successful, i.e. the second position information is not received (Step S503: No), alive monitor 21 determines that the current state of mobile body M is normal (Step S505). That is, alive monitor 21 determines that mobile body M is currently normal but out of range of radio communication.

Thus, in the example illustrated in FIG. 3, alive monitor 21 determines whether the current state of mobile body M is anomalous, depending on whether communicator 23 receives the second position information from each of the other mobile bodies not less in number than threshold T from among the one or more other mobile bodies which locate the predetermined distance from the position indicated by the first position information.

In this way, in the case where the latest first position information is not received from monitoring target mobile body M despite the second position information being received from each of the other mobile bodies not less in number than threshold T present around mobile body M, it is determined that the current state of mobile body M is anomalous. In the case where the second position information is not received from each of the other mobile bodies not less in number than threshold T, it is determined that the current state of mobile body M is normal and mobile body M is out of range of radio communication. That is, in the case where communication cannot be performed not only with monitoring target mobile body M but also with the other mobile bodies around mobile body M, mobile body M is determined to be currently normal. In the case where communication can be performed with the other mobile bodies around mobile body M, mobile body M is determined to be currently anomalous. Hence, even when the communication with mobile body M is currently not possible, whether mobile body M is currently out of range of radio communication or anomalous can be determined appropriately. The second position information may be the latest of the monitoring data stored in monitoring data storage 25. When performing, in the case where the determination (Step S503) results in mobile body M being anomalous (Step S504), the anomalous state process (Step S7 in FIG. 2) corresponding to the determination result as estimation information, the process performed may be the same as or different from that corresponding to the determination result based on the analysis in the case of receiving the latest monitoring data (Step S2 in FIG. 2).

Figure 4:
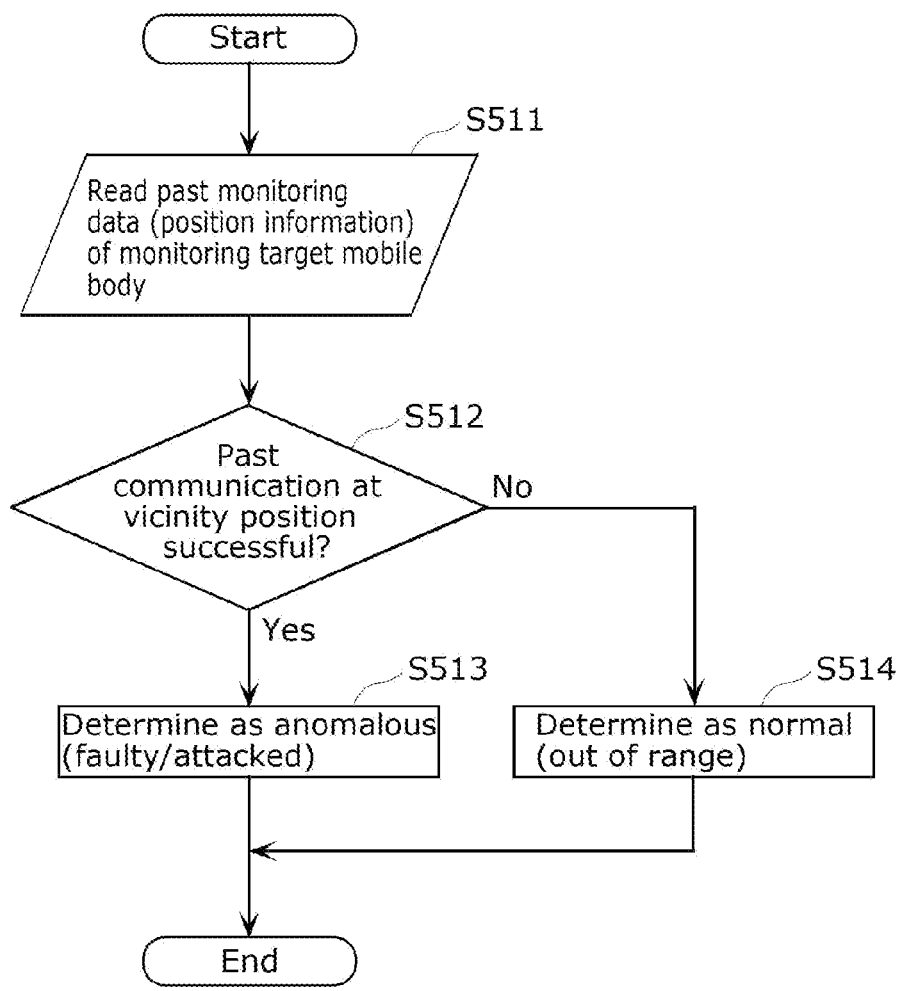
FIG. 4 is a flowchart illustrating another example of the anomaly determination process using position information by the server in the embodiment.

FIG. 4 is a flowchart illustrating another example of an anomaly determination process using position information by server 20. The anomaly determination process is the process in Step S5 in FIG. 2.

In the example illustrated in FIG. 4, the past monitoring data of mobile body M is first position information indicating the past position of mobile body M.

In such a case, alive monitor 21 reads the first position information that is the past monitoring data of monitoring target mobile body M from monitoring data storage 25 (Step S511), as illustrated in FIG. 4. For example, alive monitor 21 reads the most recently stored monitoring data from among the past plurality of items of monitoring data of mobile body M stored in monitoring data storage 25.

Alive monitor 21 then specifies a predetermined distance from the position indicated by the first position information that is the most recently stored monitoring data. For example, the predetermined range is a range within radius R [m] from the position indicated by the first position information.

Following this, alive monitor 21 determines whether the communication by mobile body M was successful in the past at a vicinity position which is a position within the specified predetermined range (Step S512). That is, alive monitor 21 determines whether, before the first position information that is the monitoring data stored most recently in monitoring data storage 25, the third position information indicating the vicinity position was received by communicator 23 and stored in monitoring data storage 25.

In the case where alive monitor 21 determines that the communication was successful in the past (Step S512: Yes), alive monitor 21 determines that the current state of mobile body M is anomalous (Step S513). In other words, in the case where alive monitor 21 determines that the third position information indicating the vicinity position was received by communicator 23 and stored in monitoring data storage 25 before the most recently stored first position information, alive monitor 21 determines that the current state of mobile body M is anomalous. That is, alive monitor 21 determines that mobile body M is currently faulty or cyberattacked. In the case where alive monitor 21 determines that the communication was not successful in the past (Step S512: No), alive monitor 21 determines that the current state of mobile body M is normal (Step S514). In other words, in the case where alive monitor 21 determines that the third position information indicating the vicinity position was not received by communicator 23 before the most recently stored first position information, alive monitor 21 determines that the current state of mobile body M is normal. That is, alive monitor 21 determines that mobile body M is currently normal but out of range of radio communication.

Thus, in the example illustrated in FIG. 4, alive monitor 21 determines whether the current state of mobile body M is anomalous, depending on whether communicator 23 receives the third position information indicating the vicinity position from mobile body M before receiving the first position information. The vicinity position is a position within the predetermined distance from the position indicated by the first position information.

In this way, in the case where, before the first position information, the third position information indicating the vicinity of the position indicated by the first position information is received, it is determined that the current state of mobile body M is anomalous. In the case where the third position information is not received, it is determined that the current state of mobile body M is normal and mobile body M is out of range of radio communication. That is, in the case where the communication with mobile body M was lost in the past after receiving first position information indicating a similar position to that of the most recently stored first position information, it is determined that mobile body M is currently normal. In the case where the communication with mobile body M was not lost in the past after receiving first position information indicating a similar position to that of the most recently stored first position information, it is determined that mobile body M is currently anomalous. Hence, even when the communication with mobile body M is currently not possible, whether mobile body M is currently out of range of radio communication or anomalous can be determined appropriately. When performing, in the case where the determination (Step S512) results in mobile body M being anomalous (Step S513), the anomalous state process (Step S7 in FIG. 2) corresponding to the determination result as estimation information, the process performed may be the same as or different from that corresponding to the determination result based on the analysis in the case of receiving the latest monitoring data (Step S2 in FIG. 2).

Figure 5:
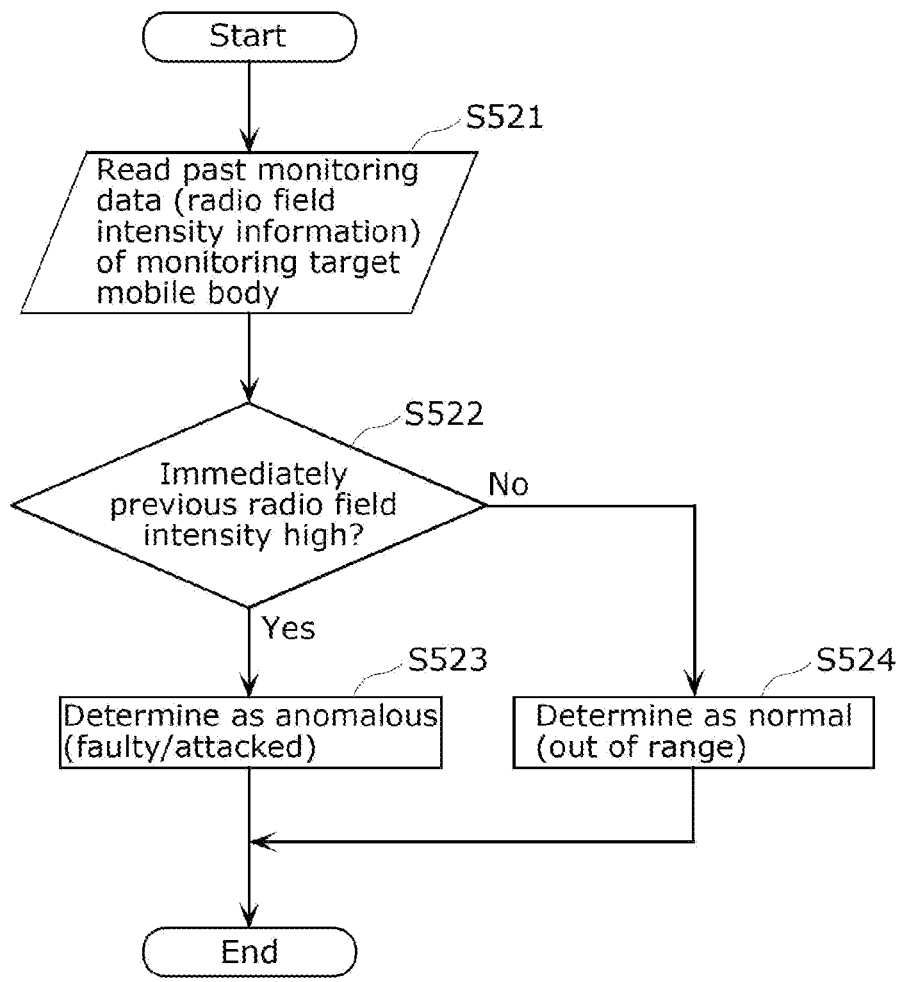
FIG. 5 is a flowchart illustrating an example of an anomaly determination process using radio field intensity information by the server in the embodiment.

FIG. 5 is a flowchart illustrating an example of an anomaly determination process using radio field intensity information by server 20. The anomaly determination process is the process in Step S5 in FIG. 2.

In the example illustrated in FIG. 5, determination information storage 24 stores a threshold for radio field intensity to determine whether the first mobile body is anomalous. The past monitoring data of mobile body M indicates the past radio field intensity of radio used for the communication between mobile body M and communicator 23. That is, the past monitoring data is radio field intensity information indicating the past radio field intensity.

In such a case, alive monitor 21 reads the radio field intensity information that is the past monitoring data of mobile body M from monitoring data storage 25 (Step S521), as illustrated in FIG. 5. For example, alive monitor 21 reads the most recently stored radio field intensity information from among the past plurality of items of radio field intensity information of mobile body M stored in monitoring data storage 25.

Following this, alive monitor 21 determines whether the radio field intensity indicated by the read radio field intensity information, i.e. the immediately previous radio field intensity, is high (Step S522). Specifically, alive monitor 21 derives the threshold for the radio field intensity from the determination information stored in determination information storage 24, and determines whether the radio field intensity indicated by the radio field intensity information is greater than or equal to the threshold. The determination information may indicate the threshold.

In the case where alive monitor 21 determines that the radio field intensity is high (Step S522: Yes), alive monitor 21 determines that the current state of mobile body M is anomalous (Step S523). That is, alive monitor 21 determines that mobile body M is currently faulty or cyberattacked. In the case where alive monitor 21 determines that the radio field intensity is not high (Step S522: No), alive monitor 21 determines that the current state of mobile body M is normal (Step S524). That is, alive monitor 21 determines that mobile body M is currently normal but out of range of radio communication.

Thus, in the example illustrated in FIG. 5, alive monitor 21 determines whether the current state of mobile body M is anomalous, depending on whether the past radio field intensity is greater than or equal to the threshold.

In this way, for example, in the case where the radio field intensity indicated by the past monitoring data stored most recently in monitoring data storage 25 is greater than or equal to the threshold, it is determined that the current state of mobile body M is anomalous. In the case where the radio field intensity is less than the threshold, it is determined that the current state of mobile body M is normal and mobile body M is out of range of radio communication. Hence, even when the communication with mobile body M is currently not possible, whether mobile body M is currently out of range of radio communication or anomalous can be determined appropriately. When performing, in the case where the determination (Step S522) results in mobile body M being anomalous (Step S523), the anomalous state process (Step S7 in FIG. 2) corresponding to the determination result as estimation information, the process performed may be the same as or different from that corresponding to the determination result based on the analysis in the case of receiving the latest monitoring data (Step S2 in FIG. 2).

Figure 6:
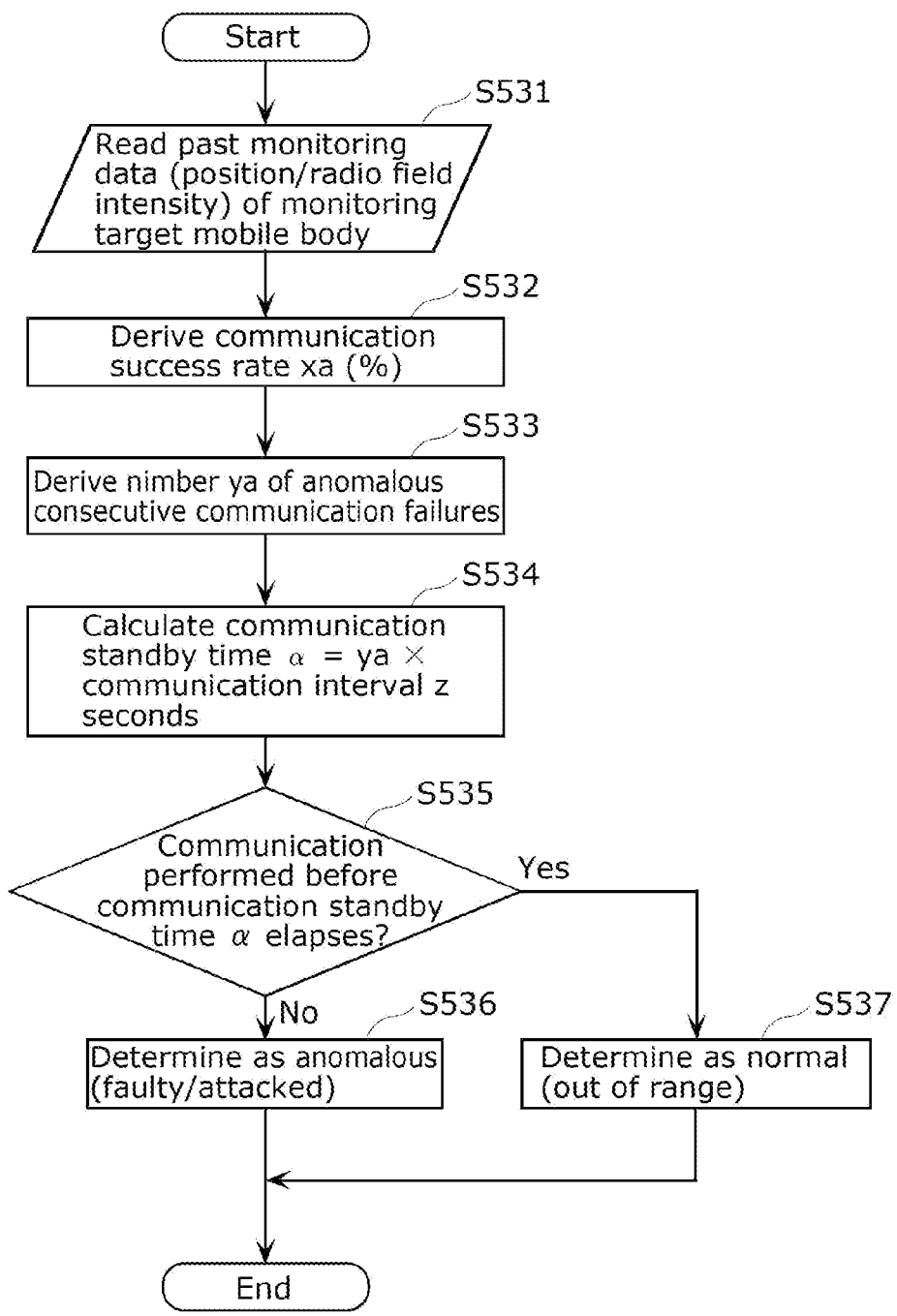
FIG. 6 is a flowchart illustrating an example of an anomaly determination process using position information or radio field intensity information by the server in the embodiment.

FIG. 6 is a flowchart illustrating an example of an anomaly determination process using position information or radio field intensity information by server 20. The anomaly determination process is the process in Step S5 in FIG. 2.

In the example illustrated in FIG. 6, determination information storage 24 stores determination information for determining the state of mobile body M. The past monitoring data of mobile body M indicates the past position of mobile body M or the past radio field intensity of radio used for the communication between mobile body M and communicator 23. That is, the past monitoring data is position information indicating the past position of mobile body M or radio field intensity information indicating the past radio field intensity.

In such a case, alive monitor 21 reads the position information or radio field intensity information that is the past monitoring data of mobile body M from monitoring data storage 25 (Step S531), as illustrated in FIG. 6. For example, alive monitor 21 reads the most recently stored position information or radio field intensity information from among the past plurality of items of position information or radio field intensity information of mobile body M stored in monitoring data storage 25.

Following this, alive monitor 21 derives the communication success rate "xa (%)" between mobile body M and communicator 23, using the read position information or radio field intensity information and the determination information stored in determination information storage 24 (Step S532).

Following this, alive monitor 21 derives the number "ya" of consecutive communication trials considered to be sufficient for communication to be successful between mobile body M and communicator 23, using the derived communication success rate "xa (%)" (Step S533).

Following this, alive monitor 21 multiplies the number "ya" of consecutive communication trials by a communication interval "z seconds", to calculate a communication standby time "a seconds" (Step S534). The communication interval is, for example, the monitoring data or heartbeat transmission cycle.

Alive monitor 21 then determines whether communication is performed between mobile body M and communicator 23 before the communication standby time "a seconds" elapses from the timing at which communicator 23 is scheduled to receive the latest monitoring data (Step S535). That is, alive monitor 21 determines whether the latest monitoring data is received before the communication standby time "a seconds" elapses from the timing of determining that the latest monitoring data is not received in Step S1 in FIG. 2.

In the case where alive monitor 21 determines that the communication is not performed (Step S535: No), alive monitor 21 determines that the current state of mobile body M is anomalous (Step S536). That is, alive monitor 21 determines that mobile body M is currently faulty or cyberattacked. In the case where alive monitor 21 determines that the communication is performed (Step S535: Yes), alive monitor 21 determines that the current state of mobile body M is normal (Step S537). That is, alive monitor 21 determines that mobile body M is currently normal but is located nearly out of range of radio communication.

Figure 7:
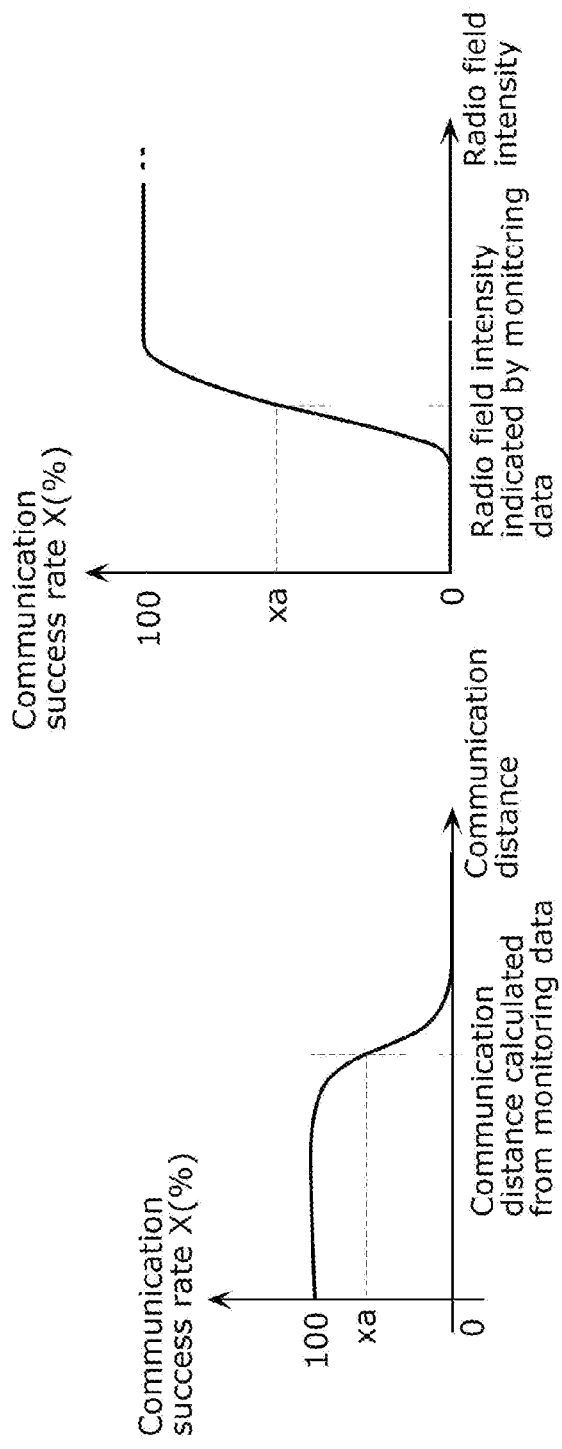
FIG. 7($a$) and FIG. 7($b$) are diagrams for describing a process of deriving a communication success rate in the embodiment.

FIG. 7 is a diagram for describing a process of deriving the communication success rate. (a) in FIG. 7 is a graph illustrating the relationship between communication success rate X and the communication distance. (b) in FIG. 7 is a graph illustrating the relationship between communication success rate X and the radio field intensity. For example, the determination information stored in determination information storage 24 indicates these graphs.

In Step S532 in FIG. 6, for example, alive monitor 21 derives the communication success rate "xa (%)" using the graph in (a) or (b) in FIG. 7.

Specifically, in the case where the monitoring data read in Step S531 in FIG. 6 is the position information, alive monitor 21 uses the graph in (a) in FIG. 7. In this case, alive monitor 21 calculates the communication distance between the position of mobile body M indicated by the read position information and the position of the base station that is included in communication network N and performs radio communication with mobile body M. The position of the base station may be indicated in the determination information. Alive monitor 21 then derives the communication success rate associated with the communication distance in the graph in (a) in FIG. 7, as the communication success rate "xa (%)" between mobile body M and communicator 23.

In the case where the monitoring data read in Step S531 in FIG. 6 is the radio field intensity information, alive monitor 21 uses the graph in (b) in FIG. 7. In this case, alive monitor 21 derives the communication success rate associated with the radio field intensity indicated by the radio field intensity information in the graph in (b) in FIG. 7, as the communication success rate "xa (%)" between mobile body M and communicator 23.

Figure 8:
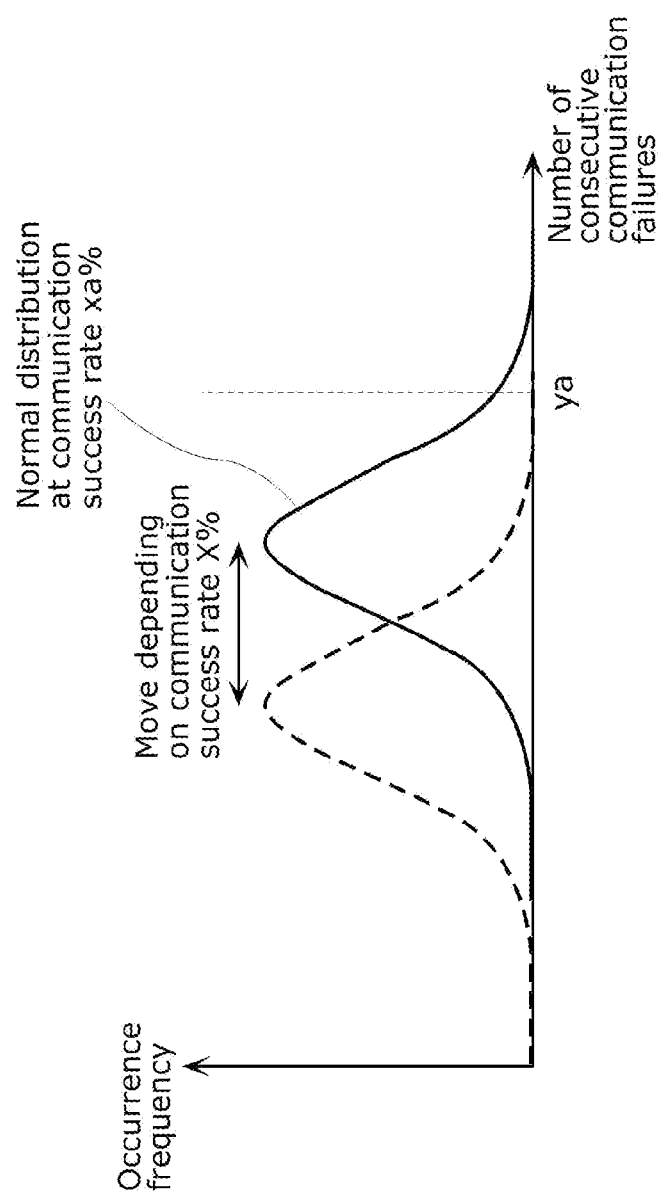
FIG. 8 is a diagram for describing a process of deriving the number of consecutive communication trials considered to be sufficient for communication to be successful from the communication success rate in the embodiment.

FIG. 8 is a diagram for describing a process of deriving, from the communication success rate, the number of consecutive communication trials considered to be sufficient for communication to be successful. Specifically, FIG. 8 is a graph illustrating the relationship between the number of consecutive communication failures and the occurrence frequency of an event in which communication fails consecutively the corresponding number of times. In the graph, the horizontal axis represents the number of consecutive communication failures, and the vertical axis represents the occurrence frequency.

The relationship between the number of consecutive communication failures and the occurrence frequency is a normal distribution, as illustrated in the graph in FIG. 8. In Step S533 in FIG. 6, alive monitor 21 moves the normal distribution in the horizontal axis direction depending on communication success rate X. For example, in the case where the number of consecutive communication failures decreases to the left in the horizontal axis and increases to the right in the horizontal axis, alive monitor 21 moves the normal distribution more to the left when communication success rate X is higher.

Alive monitor 21 then derives, from the normal distribution, the number "ya" of consecutive communication trials considered to be sufficient for communication to be successful, by one-sided testing. For example, in the case where the normal distribution is divided into two regions at the number "ya" of consecutive communication trials, alive monitor 21 derives "ya" so that the proportion of the area of the right region to the whole area of the normal distribution will be 5%.

Thus, in the example illustrated in FIGS. 6 to 8, alive monitor 21 calculates the communication standby time based on the past position or past radio field intensity indicated by the past monitoring data and the determination information. Alive monitor 21 then determines whether the current state of mobile body M is anomalous, depending on whether communicator 23 receives the latest monitoring data before the communication standby time "a seconds" elapses from the timing at which communicator 23 is scheduled to receive the latest monitoring data.

In this way, in the case where the latest monitoring data is not received from mobile body M even after at least the communication standby time elapses, it is determined that the current state of mobile body M is anomalous. In the case where the latest monitoring data is received from mobile body M before the communication standby time elapses, it is determined that the current state of mobile body M is normal and mobile body M is nearly out of range of radio communication. Hence, even when the communication with mobile body M is currently not possible, whether mobile body M is nearly out of range of radio communication or anomalous can be determined appropriately. When performing, in the case where the determination (Step S535) results in mobile body M being anomalous (Step S536), the anomalous state process (Step S7 in FIG. 2) corresponding to the determination result as estimation information, the process performed may be the same as or different from that corresponding to the determination result based on the analysis in the case of receiving the latest monitoring data (Step S2 in FIG. 2).

Figure 9:
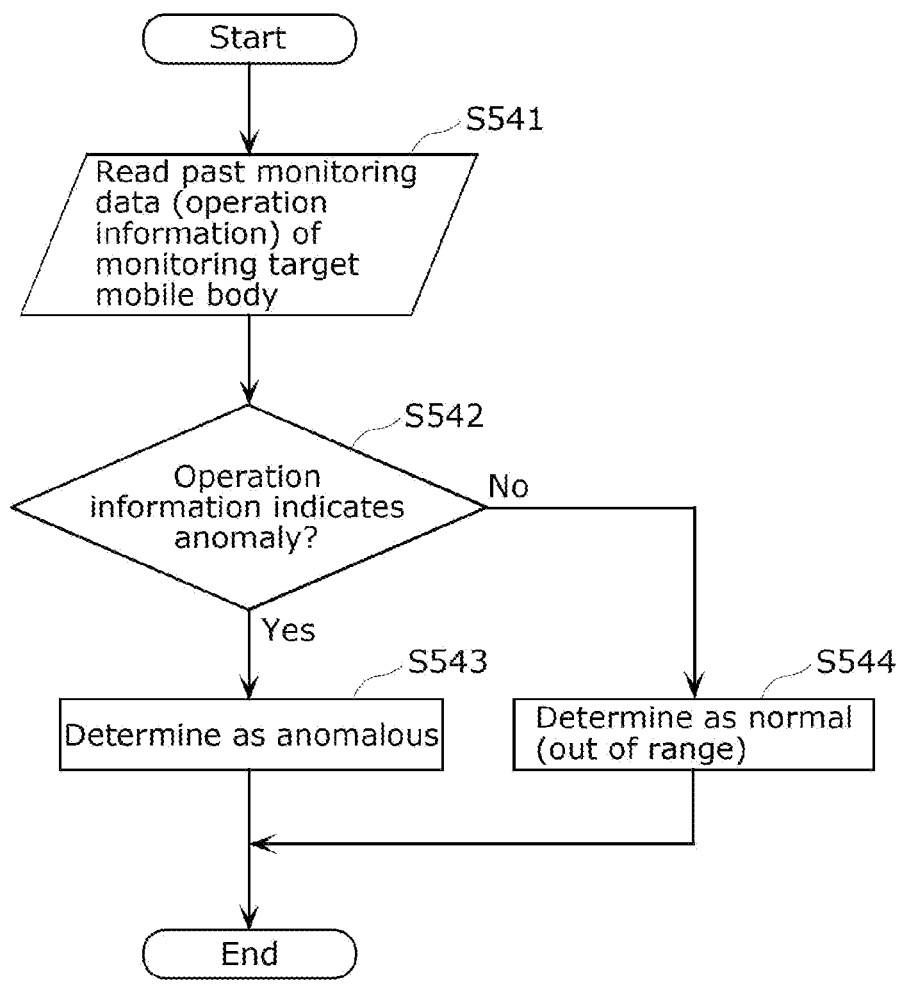
FIG. 9 is a flowchart illustrating an example of an anomaly determination process using operation information by the server in the embodiment.

FIG. 9 is a flowchart illustrating an example of an anomaly determination process using operation information by server 20. The anomaly determination process is the process in Step S5 in FIG. 2.

In the example illustrated in FIG. 9, the past monitoring data of mobile body M is operation information indicating whether the past operation or function of mobile body M is anomalous or normal.

In such a case, alive monitor 21 reads the operation information that is the past monitoring data of mobile body M from monitoring data storage 25 (Step S541), as illustrated in FIG. 9. For example, alive monitor 21 reads the most recently stored operation information from among the past plurality of items of operation information of mobile body M stored in monitoring data storage 25.

Following this, alive monitor 21 determines whether the read operation information indicates anomaly (Step S542). In the case where alive monitor 21 determines that the read operation information indicates anomaly (Step S542: Yes), alive monitor 21 determines that the current state of mobile body M is anomalous (Step S543). In the case where alive monitor 21 determines that the operation information does not indicate anomaly (Step S542: No), alive monitor 21 determines that the current state of mobile body M is normal (Step S544). That is, alive monitor 21 determines that mobile body M is currently normal but out of range of radio communication.

Figure 10:
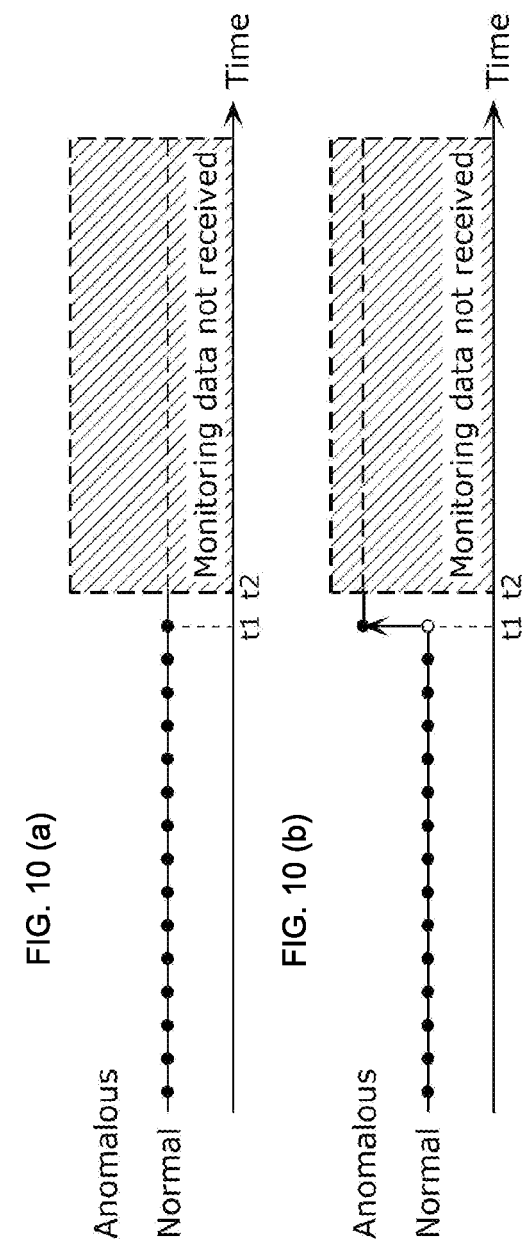
FIG. 10($a$) and FIG. 10($b$) are diagrams for describing the anomaly determination process using operation information by the server in the embodiment.

FIG. 10 is a diagram for describing the anomaly determination process using operation information by server 20. (a) and (b) in FIG. 10 each illustrate the details of periodically transmitted operation information and its relationship with time.

For example, in (a) in FIG. 10, the operation information periodically received by communicator 23 indicates normality, up to time t1. In the case where the latest operation information is not received by communicator 23 at time t2, alive monitor 23 reads the most recently stored operation information from among the past plurality of items of operation information of mobile body M stored in monitoring data storage 25. That is, alive monitor 23 reads operation information received by communicator 23 and stored in monitoring data storage 25 at time t1. In the example illustrated in (a) in FIG. 10, the operation information indicates normality, so that alive monitor 23 determines that the state of mobile body M at time t2, i.e. the current state of mobile body M, is normal.

In (b) in FIG. 10, the operation information periodically received by communicator 23 indicates normality until immediately before time t1, and the operation information received by communicator 23 at time t1 indicates anomaly. In the case where the latest operation information is not received by communicator 23 at time t2, alive monitor 23 reads the most recently stored operation information from among the past plurality of items of operation information of mobile body M stored in monitoring data storage 25. That is, alive monitor 23 reads operation information received by communicator 23 and stored in monitoring data storage 25 at time t1. In the example illustrated in (b) in FIG. 10, the operation information indicates anomaly, so that alive monitor 23 determines that the state of mobile body M at time t2, i.e. the current state of mobile body M, is anomalous.

Thus, in the example illustrated in FIGS. 9 and 10, alive monitor 21 determines whether the current state of mobile body M is anomalous, depending on the operation information.

In this way, for example, in the case where the past operation information stored most recently in monitoring data storage 25 indicates the past operation or function of mobile body M to be anomalous, it is determined that the current state of mobile body M is anomalous. In the case where the past operation information indicates the past operation or function of mobile body M to be normal, it is determined that the current state of mobile body M is normal and mobile body M is out of range of radio communication. In other words, in the case where the immediately previous operation information indicates normality and subsequently the communication with mobile body M is lost, it is determined that mobile body M is currently normal. In the case where the immediately previous operation information indicates anomaly and subsequently the communication with mobile body M is lost, it is determined that mobile body M is currently anomalous. Hence, even when the communication with mobile body M is currently not possible, whether mobile body M is currently out of range of communication or anomalous can be determined appropriately. When performing, in the case where the determination (Step S542) results in mobile body M being anomalous (Step S543), the anomalous state process (Step S7 in FIG. 2) corresponding to the determination result as estimation information, the process performed may be the same as or different from that corresponding to the determination result based on the analysis in the case of receiving the latest monitoring data (Step S2 in FIG. 2).

Figure 11:
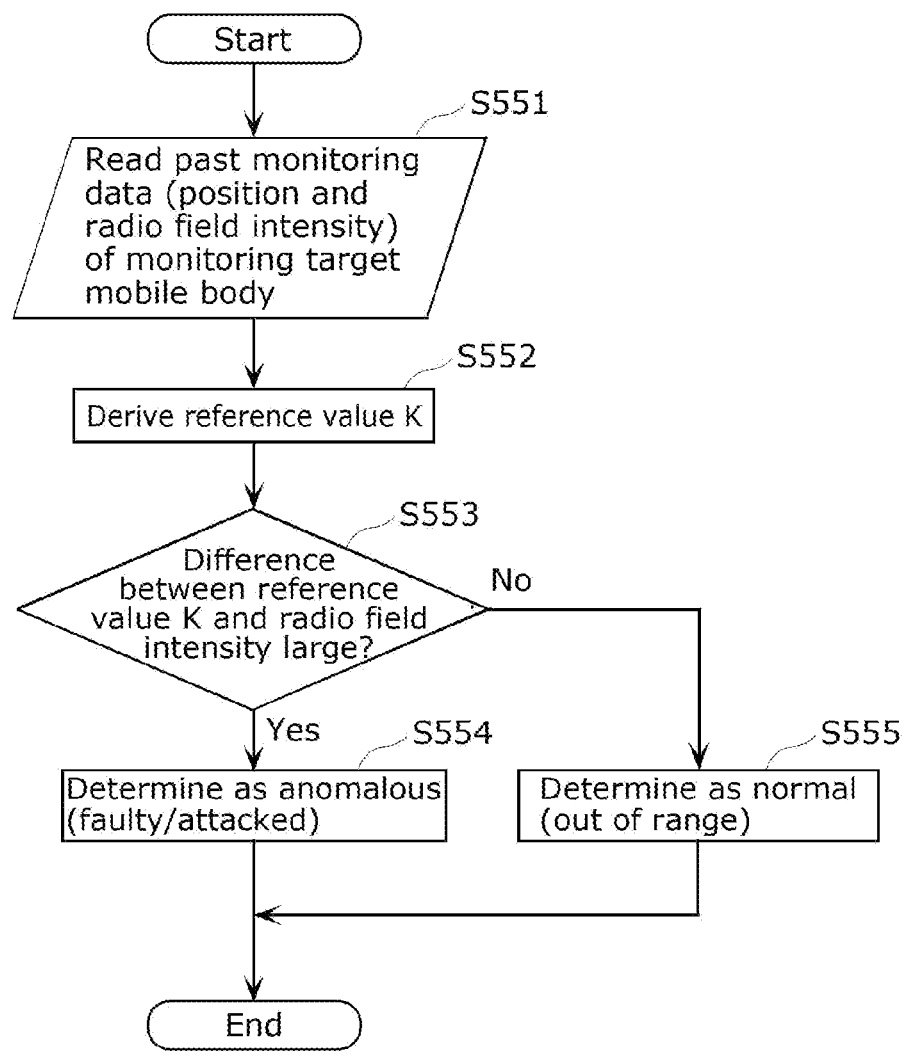
FIG. 11 is a flowchart illustrating an example of an anomaly determination process using position information and radio field intensity information by the server in the embodiment.

FIG. 11 is a flowchart illustrating an example of an anomaly determination process using position information and radio field intensity information by server 20. The anomaly determination process is the process in Step S5 in FIG. 2.

In the example illustrated in FIG. 11, the past monitoring data of mobile body M indicates the past position of mobile body M and the past radio field intensity of radio used for the communication between mobile body M and communicator 23.

In such a case, alive monitor 21 reads the past monitoring data of mobile body M from monitoring data storage 25 (Step S551), as illustrated in FIG. 11. For example, alive monitor 21 reads the most recently stored monitoring data from among the past plurality of items of monitoring data of mobile body M stored in monitoring data storage 25.

Following this, alive monitor 21 derives reference value K of radio field intensity (Step S552). For example, alive monitor 21 selects one or more items of monitoring data from all items of monitoring data stored in monitoring data storage 25. The one or more items of monitoring data each indicate a position within a predetermined distance from the position indicated by the most recent monitoring data read in Step S551. Alive monitor 21 derives the average of the radio field intensities indicated by the selected items of monitoring data, as reference value K. Reference value K may be stored in determination information storage 24 as determination information.

Alive monitor 21 determines whether the difference between the radio field intensity indicated by the most recent monitoring data read in Step S551 and reference value K derived in Step S552 is greater than or equal to the threshold (Step S553). In the case where alive monitor 21 determines that the difference is large (Step S553: Yes), alive monitor 21 determines that the current state of mobile body M is anomalous (Step S554). That is, alive monitor 21 determines that mobile body M is currently faulty or cyberattacked. For example, in the case where the radio field intensity is high despite reference value K being small, it is determined that mobile body M is cyberattacked by a man-in-the-middle. In the case where alive monitor 21 determines that the difference is not large (Step S553: No), alive monitor 21 determines that the current state of mobile body M is normal (Step S555). That is, alive monitor 21 determines that mobile body M is currently normal but out of range of radio communication.

Thus, in the example illustrated in FIG. 11, alive monitor 21 determines whether the current state of mobile body M is anomalous, depending on whether the difference between the past radio field intensity indicated by the past monitoring data and the reference value of the radio field intensity at the past position indicated by the monitoring data is greater than the threshold.

In this way, for example, in the case where the difference between the radio field intensity indicated by the past monitoring data stored most recently in monitoring data storage 25 and the reference value of the radio field intensity at the position indicated by the monitoring data is large, it is determined that the current state of mobile body M is anomalous. In the case where the difference between the radio field intensity and the reference value is small, it is determined that the current state of mobile body M is normal and mobile body M is out of range of communication. Hence, even when the communication with mobile body M is currently not possible, whether mobile body M is currently out of range of communication or anomalous can be determined appropriately. When performing, in the case where the determination (Step S553) results in mobile body M being anomalous (Step S554), the anomalous state process (Step S7 in FIG. 2) corresponding to the determination result as estimation information, the process performed may be the same as or different from that corresponding to the determination result based on the analysis in the case of receiving the latest monitoring data (Step S2 in FIG. 2).

As described above, with server 20 in this embodiment, even when the latest monitoring data cannot be received monitoring target mobile body M, the current state of mobile body M is determined from the past monitoring data. Therefore, for example, even when the communication with mobile body M is unstable and is currently not possible, whether mobile body M is currently out of range of radio communication or anomalous can be determined appropriately. In the case where mobile body M is determined to be anomalous, the anomaly can be notified.

(Variation 1)

Figure 12:
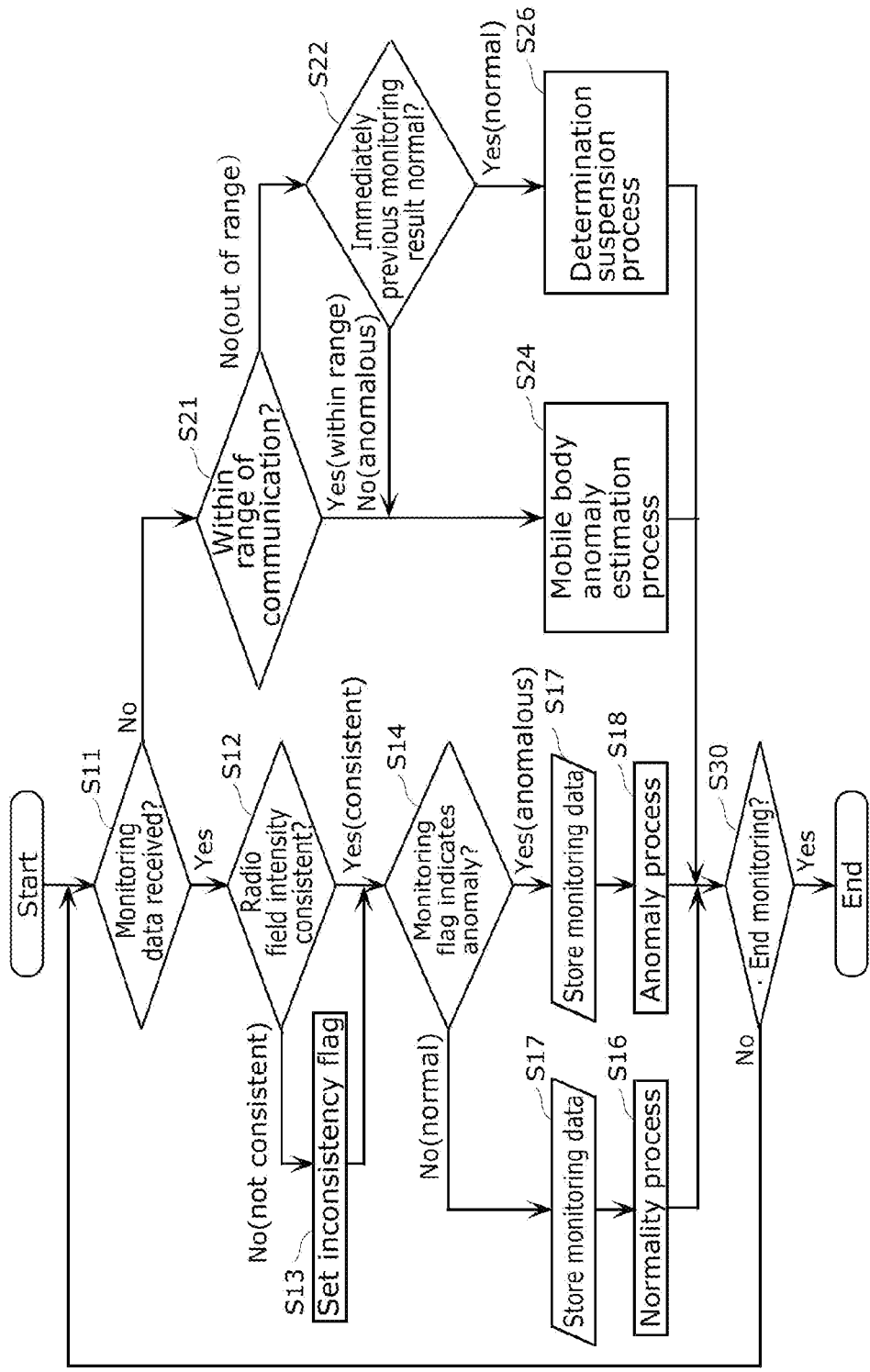
FIG. 12 is a flowchart illustrating an example of the overall process operation of a server in Variation 1 of the embodiment.

FIG. 12 is a flowchart illustrating an example of the overall process operation of server 20 in Variation 1 of the embodiment.

Alive monitor 21 in server 20 determines whether the latest monitoring data is received by communicator 23 (Step S11).

In the case where alive monitor 21 determines that the latest monitoring data is received (Step S11: Yes), alive monitor 21 determines whether the radio field intensity indicated by the latest monitoring data is consistent (Step S12). For example, in the case where the difference between the radio field intensity and the reference value is not greater than the threshold as in the example illustrated in FIG. 11, alive monitor 21 determines that the radio field intensity is consistent. In the case where alive monitor 21 determines that the radio field intensity is not consistent (Step S12: No), alive monitor 21 sets an inconsistency flag to 1 (Step S13). In the case where alive monitor 21 determines that the radio field intensity is consistent (Step S12: Yes), alive monitor 21 determines whether a monitoring flag indicates anomaly (Step S14). For example, in the case where, as a result of analyzing the latest monitoring data, the monitoring data is anomalous, alive monitor 21 sets the monitoring flag to 1. In the case where the monitoring data is normal, alive monitor 21 sets the monitoring flag to 0. In the case where the inconsistency flag is set to 1 in Step S13, alive monitor 21, on the ground that the latest monitoring data is anomalous, sets the monitoring flag for the monitoring data to 1. In Step S14, whether the monitoring flag indicates anomaly, i.e. whether the monitoring flag is set to 1, is determined.

In the case where alive monitor 23 determines that the monitoring flag indicates normality in Step S14 (Step S14: No), alive monitor 23 stores the latest monitoring data in monitoring data storage 25 (Step S15). Server 20 then performs a process using the monitoring data as a normality process (Step S16). In the case where alive monitor 23 determines that the monitoring flag indicates anomaly in Step S14 (Step S14: Yes), alive monitor 23 stores the latest monitoring data in monitoring data storage 25 (Step S17). Server 20 then performs a process using the monitoring data as an anomaly process (Step S16).

In the case where alive monitor 21 determines that the latest monitoring data is not received in Step S11 (Step S11: No), alive monitor 21 determines whether mobile body M is within range of radio communication (Step S21). For example, alive monitor 21 determines whether the current position of mobile body M is within range of communication, based on the position indicated by the monitoring data stored most recently in monitoring data storage 25 and a map stored in determination information storage 24 as determination information. For example, the map indicates, for each of a plurality of regions, whether the region is within range or out of range. In the case where alive monitor 21 determines that mobile body M is within range (Step S21: Yes), server 20 performs a mobile body anomaly estimation process (Step S24). For example, alive monitor 21 estimates that anomaly occurs in monitoring target mobile body M or communicator 23, and notifies the estimation result.

In the case where alive monitor 21 determines that mobile body M is out of range (Step S21: No), alive monitor 21 further determines whether the monitoring result for the monitoring data stored most recently in monitoring data storage 25 indicates normality (Step S22). That is, alive monitor 21 determines whether the monitoring flag for the monitoring data stored most recently in monitoring data storage 25 indicates normality. In the case where alive monitor 21 determines that the monitoring result does not indicate normality (Step S22: No), server 20 performs the foregoing mobile body anomaly estimation process. In the case where alive monitor 21 determines that the monitoring result indicates normality (Step S22: Yes), server 20 performs a determination suspension process of suspending the determination of whether the current state of mobile body M is anomalous (Step S26).

After each of Steps S16, S18, S24, and S26, server 20 determines whether to end the alive monitoring for mobile body M (Step S30). In the case where server 20 determines not to end the alive monitoring (Step S30: No), server 20 repeats the process from Step S11. In the case where server 20 determines to end the alive monitoring (Step S30: Yes), server 20 ends the alive monitoring for mobile body M.

(Variation 2)

In the foregoing embodiment and Variation 1, terminal device 10 does not store monitoring data. Alternatively, terminal device 10 may store the monitoring data.

Figure 13:
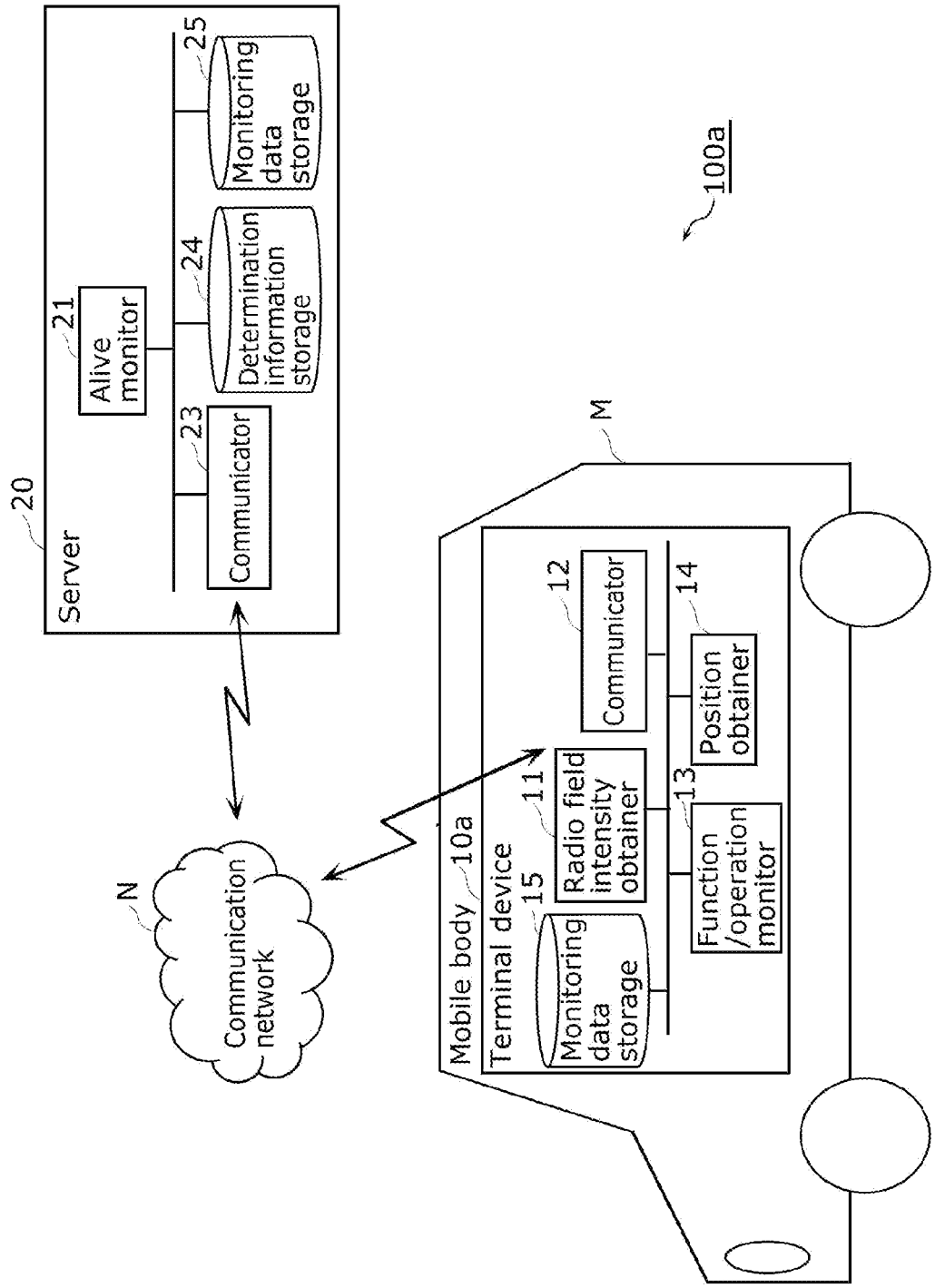
FIG. 13 is a diagram illustrating an example of the structure of a communication system in Variation 2 of the embodiment.

FIG. 13 is a diagram illustrating an example of the structure of a communication system in Variation 2 of the embodiment.

Communication system 100a in Variation 2 includes terminal device 10a, communication network N, and server 20.

Terminal device 10a is an information processing device mounted in mobile body M such as a vehicle. Terminal device 10a in this variation includes radio field intensity obtainer 11, communicator 12, function/operation monitor 13, and position obtainer 14 as in the foregoing embodiment, and further includes monitoring data storage 15.

Monitoring data storage 15 stores monitoring data not transmitted to server 20. For example, upon obtaining monitoring data, each of radio field intensity obtainer 11, function/operation monitor 13, and position obtainer 14 outputs the monitoring data to communicator 12, and stores the monitoring data in monitoring data storage 15. Communicator 12 transmits the monitoring data to server 20. In the case where communicator 12 has successfully transmitted the monitoring data to server 20, the monitoring data may be deleted from monitoring data storage 15. Thus, monitoring data storage 15 stores monitoring data not transmitted to server 20. Once the communication with server 20 has become possible, communicator 12 may transmit the monitoring data stored in monitoring data storage 15 to server 20.

In this way, even if there is a period during which server 20 cannot communicate with mobile body M, i.e. terminal device 10a, once the communication has become possible, server 20 can receive, from terminal device 10a, the monitoring data obtained in terminal device 10a during the period. This can prevent monitoring data from being unreceived by server 20.

Although the above describes information processing devices such as a server and a terminal device according to one or more aspects of the present disclosure based on at least one embodiment, the present disclosure is not limited to such embodiment. Modifications obtained by applying various changes conceivable by a person skilled in the art to the foregoing at least one embodiment may also be included in the scope of the present disclosure, without departing from the scope of the present disclosure. If there are a plurality of different embodiments, combinations of structural elements in these embodiments may also be included in the scope of the present disclosure. If there is at least one variation, combinations of structural elements in at least one embodiment and at least one variation may also be included in the scope of the present disclosure. If there are a plurality of different variations, combinations of structural elements in these variations may also be included in the scope of the present disclosure.

For example, communicator 12 in terminal device 10 or 10a may transmit monitoring data to server 20 depending on the situation, without being restricted by the monitoring data transmission cycle. For example, in the case where communicator 12 has failed to transmit monitoring data to server 20, upon subsequently detecting that the communication with server 20 has become possible, communicator 12 may transmit the monitoring data without waiting for the timing according to the monitoring data transmission cycle. In the case where the radio field intensity obtained by radio field intensity obtainer 11 falls below a threshold, communicator 12 may transmit the monitoring data to server 20 without waiting for the timing according to the monitoring data transmission cycle. Alternatively, communicator 12 may transmit the monitoring data to server 20 in response to a transmission request from server 20, without waiting for the timing.

The transmission of monitoring data or a heartbeat from terminal device 10 or 10a to server 20 may be push-type transmission spontaneously performed by terminal device 10 or 10a, or pull-type transmission performed in response to a request from server 20.

The monitoring data of mobile body M may indicate the position of mobile body M and the radio field intensity of radio used for the communication between mobile body M and communicator 23 at the time of generation of the monitoring data. In this case, alive monitor 21 may determine whether the current state of mobile body M is anomalous, depending on whether the difference between a past radio field intensity indicated by past monitoring data including the third position information or a reference value of radio field intensity at a past position indicated by the past monitoring data and a radio field intensity of radio communication indicated by latest monitoring data received by communicator 23 from mobile body M is greater than or equal to the threshold, the third position information indicating a position within a predetermined distance from the position of mobile body M indicated by the latest monitoring data.

In the foregoing at least one embodiment, the functions included in server 20 may be distributed among a plurality of servers, and a system composed of the plurality of servers may achieve the functions of server 20 described in the embodiment.

In the foregoing at least one embodiment, for example, the function monitored by function/operation monitor 13 may be an anomaly detection function of detecting anomaly in mobile body M, and server 20 may be part of an anomaly monitoring system that monitors faults, etc. of mobile body M. In this case, when server 20 cannot receive monitoring data or a heartbeat, it is important to estimate whether this is because the terminal device has anomaly or mobile body M is out of range of radio communication. The present invention is useful for such purpose.

In the foregoing at least one embodiment, for example, the function monitored by function/operation monitor 13 may be a security detection function of detecting a security attack to mobile body M, and server 20 may be part of a security monitoring system that monitors the security of mobile body M. In this case, when server 20 cannot receive monitoring data or a heartbeat, it is important to estimate whether this is because terminal device 10 is under security attack or mobile body M is out of range of radio communication. The present invention is useful for such purpose.

In the foregoing at least one embodiment, in the case where alive monitor 21 determines anomaly, the anomaly may be notified to a user or owner of mobile body M or terminal device 10 or to a monitoring center of mobile body M, and may be used in anomaly determination by the monitoring center.

In the foregoing at least one embodiment, past monitoring data stored in monitoring data storage 25 may be sequentially deleted once a predetermined storage period, such as one month, has elapsed. Alternatively, the upper limit of the number of items of monitoring data or the monitoring data size may be set for each monitoring target mobile body, and monitoring data may be sequentially deleted beginning with old monitoring data once the upper limit has been reached. Here, a different upper limit may be set for each monitoring target mobile body, or a common upper limit may be set for the monitoring target mobile bodies. The upper limit may be determined from the past anomaly determination history, the average movement range, and the like.

Each of the structural elements in the foregoing at least one embodiment may be configured in the form of an exclusive hardware product, or may be realized by executing a software program suitable for the structural element. Each of the structural elements may be realized by means of a program executing unit, such as a central processing unit (CPU) and a processor, reading and executing the software program recorded on a recording medium such as a hard disk or semiconductor memory. For example, software for realizing the information processing device, etc. according to each embodiment is the following program.

The program causes a computer to execute the steps in each of the flowcharts in FIGS. 2 to 6, 9, 11, and 12.

The following are also included in the scope of the present disclosure.

(1) The foregoing at least one device is specifically a computer system including a microprocessor, read only memory (ROM), random access memory (RAM), a hard disk unit, a display unit, a keyboard, a mouse, or the like. A computer program is recorded in the RAM or hard disk unit. The foregoing at least one device achieves its functions by the microprocessor operating according to the computer program. The computer program is configured by combining multiple command codes indicating instructions to the computer, to achieve predetermined functions.

(2) Part or all of the structural elements constituting the foregoing at least one device may be configured as a single system large scale integration (LSI). A system LSI is a super-multifunctional LSI manufactured integrating multiple components on a single chip, and specifically is a computer system including a microprocessor, ROM, RAM, and so forth. A computer program is recorded in the RAM. The system LSI achieves its functions by the microprocessor operating according to the computer program.

(3) Part or all of the structural elements constituting the foregoing at least one device may be configured as an IC card detachably mountable to the device or a standalone module. The IC card or module is a computer system including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(4) The present disclosure may be the above-described methods, or may be a computer program which realizes these methods by a computer, or may be digital signals made up of the computer program.

The present disclosure may be the computer program or the digital signals recorded in a computer-readable recording medium, such as flexible disk, hard disk, compact disc (CD)-ROM, DVD, DVD-ROM, DVD-RAM, Blu-ray® disc (BD), or semiconductor memory. The present disclosure may also be the digital signals recorded in these recording mediums.

The present disclosure may be an arrangement where the computer program or the digital signals are transmitted over an electric communication line, a wireless or wired communication line, a network such as the Internet, data broadcasting, or the like.

The present disclosure may also be carried out by another independent computer system, by the program or digital signals being recorded in the recording medium and being transported, or by the program or digital signals being transferred over the network or the like.

While an exemplary embodiment has been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following Japanese Patent Application including specification, drawings and claims are incorporated herein by reference in their entirety: Japanese Patent Application No. 2020-085460 filed on May 14, 2020.

INDUSTRIAL APPLICABILITY

An information processing device according to the present disclosure is capable of determining the state of a mobile body more appropriately, and can be used, for example, in a server that communicates with a mobile body.

The invention claimed is:

1. An information processing device, comprising:
a transceiver that communicates with a first mobile body;
a monitoring data storage that stores past monitoring data of the first mobile body received by the transceiver;
a processor and a memory which stores an instruction, wherein when the processor executes the instruction stored in the memory, the processor operates as an alive monitor that determines whether a current state of the first mobile body is anomalous, based on the past monitoring data stored in the monitoring data storage, wherein the alive monitor determines whether the current state of the first mobile body is anomalous using the past monitoring data stored in the monitoring data storage, when the transceiver does not receive at least one of latest monitoring data or a heartbeat signal from the first mobile body; and
a determination information storage that stores a threshold for a total number of mobile bodies to determine whether the first mobile body is anomalous, wherein:
the monitoring data storage stores the past monitoring data of the first mobile body, and past monitoring data of each of a plurality of second mobile bodies received by the transceiver,
the past monitoring data of the first mobile body is first position information indicating a past position of the first mobile body, and the past monitoring data of each of the plurality of second mobile bodies is second position information indicating a past position of the second mobile body, and
if the transceiver receives the second position information from each of second mobile bodies not less in number than the threshold from among one or more second mobile bodies which locate within a predetermined distance from the past position indicated by the first position information, the alive monitor determines that the current state of the first mobile body is anomalous.

2. The information processing device according to claim 1,
wherein monitoring data of the first mobile body includes at least one of (a) first position information indicating a position of the first mobile body at a time of generation of the monitoring data, (b) radio field intensity information indicating a radio field intensity of radio used for the communication between the first mobile body and the transceiver at the time of generation of the monitoring data, or (c) operation information indicating whether an operation or function of the first mobile body is anomalous or normal at the time of generation of the monitoring data.

3. The information processing device according to claim 1, wherein the past monitoring data of the first mobile body is first position information indicating a past position of the first mobile body, and before receiving the first position information, if the transceiver receives the first position information indicating a position within a predetermined distance from the past position indicated by the first position information from the first mobile body, the alive monitor determines that the current state of the first mobile body is anomalous.

4. The information processing device according to claim 1, wherein:

the determination information storage stores a threshold for a radio field intensity to determine whether the first mobile body is anomalous, the past monitoring data of the first mobile body indicates a past radio field intensity of radio used for the communication between the first mobile body and the transceiver, and if the past radio field intensity is greater than or equal to the threshold, the alive monitor determines that the current state of the first mobile body is anomalous.

5. The information processing device according to claim 1, wherein:

the determination information storage stores determination information for determining a state of the first mobile body, the past monitoring data of the first mobile body indicates a past position of the first mobile body or a past radio field intensity of radio used for the communication between the first mobile body and the transceiver, and the alive monitor: calculates a communication standby time based on the past position or the past radio field intensity indicated by the past monitoring data and the determination information; and determines that the current state of the first mobile body is anomalous, if the transceiver does not receive the latest monitoring data before the communication standby time elapses from a timing at which the transceiver is scheduled to receive the latest monitoring data.

6. The information processing device according to claim 1, wherein the past monitoring data of the first mobile body is operation information indicating whether a past operation or function of the first mobile body is anomalous or normal, and the alive monitor determines whether the current state of the first mobile body is anomalous, depending on the operation information.

7. The information processing device according to claim 1, wherein the past monitoring data of the first mobile body indicates a past position of the first mobile body and a past radio field intensity of radio used for the communication between the first mobile body and the transceiver, and if a difference between the past radio field intensity indicated by the past monitoring data and a reference value of a radio field intensity at the past position is greater than or equal to the threshold, the alive monitor that whether the current state of the first mobile body is anomalous.

8. The information processing device according to claim 1, wherein monitoring data of the first mobile body indicates a position of the first mobile body and a radio field intensity of radio used for the communication between the first mobile body and the transceiver at a time of generation of the monitoring data, and if a difference between a radio field intensity of radio communication indicated by latest monitoring data received by the transceiver from the first mobile body and a reference value of a radio field intensity at the past position or a past radio field intensity indicated by past monitoring data including the first position information indicating a position within a predetermined distance from a position of the first mobile body indicated by the latest monitoring data is greater than or equal to the threshold, the alive monitor determines that the current state of the first mobile body is anomalous.

9. The information processing device according to claim 1, wherein:

the information processing device is mountable in the first mobile body, when the processor executes the instruction stored in the memory, the processor further operates as a receiver that periodically obtains monitoring data indicating a state of the first mobile body each time the receiver obtains the monitoring data, the transceiver transmits the monitoring data obtained, to an external device located outside the first mobile body, the monitoring data includes at least one of position information indicating a position of the first mobile body, radio field intensity information indicating a radio field intensity of radio used for the communication between the transceiver and the external device, or operation information indicating whether an operation or function of the first mobile body is normal or anomalous.

10. An information processing method executed by a computer, the information processing method comprising:

communicating with a first mobile body;

storing monitoring data of the first mobile body received through communication with the first mobile body, in a monitoring data storage;

determining whether a current state of the first mobile body is anomalous, based on past monitoring data stored in the monitoring data storage, the determining comprising determining whether the current state of the first mobile body is anomalous using the past monitoring data stored in the monitoring data storage, when not receiving at least one of latest monitoring data or a heartbeat signal from the first mobile body; and storing a threshold for a total number of mobile bodies to determine whether the first mobile body is anomalous, wherein the monitoring data storage stores the past monitoring data of the first mobile body, and past monitoring data of each of a plurality of second mobile bodies received by the transceiver, wherein the past monitoring data of the first mobile body is first position information indicating a past position of the first mobile body, and the past monitoring data of each of the plurality of second mobile bodies is second position information indicating a past position of the second mobile body, and wherein if the transceiver receives the second position information from each of second mobile bodies not less in number than the threshold from among one or more second mobile bodies which locate within a predetermined distance from the past position indicated by the first position information, the alive monitor determines that the current state of the first mobile body is anomalous.

* * * * *